United States Patent
Jin et al.

(10) Patent No.: US 12,288,066 B1
(45) Date of Patent: Apr. 29, 2025

(54) OPERATION FUSION FOR INSTRUCTIONS BRIDGING EXECUTION UNIT TYPES

(71) Applicant: Apple Inc., Cupertino, CA (US)

(72) Inventors: Zhaoxiang Jin, Austin, TX (US); Francesco Spadini, Sunset Valley, TX (US); Skanda K. Srinivasa, Austin, TX (US); Milos Becvar, Cedar Park, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/320,036

(22) Filed: May 18, 2023

Related U.S. Application Data

(60) Provisional application No. 63/376,865, filed on Sep. 23, 2022.

(51) Int. Cl.
*G06F 9/30* (2018.01)
(52) U.S. Cl.
CPC ........ *G06F 9/30134* (2013.01); *G06F 9/3001* (2013.01); *G06F 9/30036* (2013.01); *G06F 9/30043* (2013.01)
(58) Field of Classification Search
CPC .............. G06F 9/30134; G06F 9/3001; G06F 9/30036; G06F 9/30043
See application file for complete search history.

(56) References Cited

U.S. PATENT DOCUMENTS

| | | |
|---|---|---|
| 3,793,631 A | 2/1974 | Silverstein et al. |
| 5,303,356 A | 4/1994 | Vassiliadis |
| 5,420,992 A | 5/1995 | Killian |
| 5,689,695 A | 11/1997 | Read |
| 5,774,737 A | 6/1998 | Nakano |
| 5,794,063 A | 8/1998 | Favor |

(Continued)

FOREIGN PATENT DOCUMENTS

WO 2019218896 A1 11/2019

OTHER PUBLICATIONS

Office Action in U.S. Appl. No. 17/652,501 mailed Nov. 1, 2023, 47 pages.

(Continued)

*Primary Examiner* — Corey S Faherty
(74) *Attorney, Agent, or Firm* — Kowert, Hood, Munyon, Rankin & Goetzel, P.C.; Gentry C. McLean; Dean M. Munyon

(57) ABSTRACT

Techniques are disclosed that relate to fusing operations for execution of certain instructions. A processor may include a first execution circuit, of a first type, coupled to a first register file, a second execution circuit, of a second type, coupled to a second register file and a load/store circuit coupled to the first and second register files. The load/store circuit includes an issue port configured to receive an instruction operation for execution, a memory execution circuit configured to execute memory access operations, and a register transfer execution circuit. The register transfer execution circuit is configured to execute instruction operations specifying data transfer from the first register file to the second register file and an operation to be performed using the data, and the load/store circuit is configured to direct a given instruction operation from the issue port to one of the memory execution circuit or the register transfer execution circuit.

20 Claims, 12 Drawing Sheets

(56) References Cited

U.S. PATENT DOCUMENTS

| | | | |
|---|---|---|---|
| 5,805,486 A * | 9/1998 | Sharangpani | G06F 9/3881 |
| | | | 712/E9.034 |
| 5,889,984 A * | 3/1999 | Mills | G06F 9/30021 |
| | | | 712/E9.034 |
| 6,292,888 B1 | 9/2001 | Nemirovsky et al. | |
| 6,295,599 B1 | 9/2001 | Hansen et al. | |
| 6,338,136 B1 | 1/2002 | Col | |
| 6,560,624 B1 | 5/2003 | Otani et al. | |
| 6,754,810 B2 * | 6/2004 | Elliott | G06F 9/30025 |
| | | | 712/225 |
| 7,055,022 B1 | 5/2006 | Col | |
| 7,818,550 B2 | 10/2010 | Vaden | |
| 8,078,845 B2 * | 12/2011 | Sheffer | G06F 9/3826 |
| | | | 712/218 |
| 8,713,084 B2 | 4/2014 | Weinberg | |
| 9,501,286 B2 | 11/2016 | Col | |
| 9,747,101 B2 * | 8/2017 | Ould-Ahmed-Vall | |
| | | | G06F 9/30145 |
| 10,324,724 B2 | 6/2019 | Lai et al. | |
| 10,579,389 B2 | 3/2020 | Lai et al. | |
| 2001/0052063 A1 | 12/2001 | Tremblay et al. | |
| 2002/0087955 A1 | 7/2002 | Ronen et al. | |
| 2003/0167460 A1 | 9/2003 | Desai et al. | |
| 2003/0236966 A1 | 12/2003 | Samra | |
| 2004/0034757 A1 | 2/2004 | Gochman | |
| 2004/0128483 A1 | 7/2004 | Grochowski | |
| 2005/0084099 A1 | 4/2005 | Montgomery | |
| 2005/0289208 A1 | 12/2005 | Harrison | |
| 2007/0038844 A1 | 2/2007 | Valentine | |
| 2010/0115248 A1 | 5/2010 | OuZiel et al. | |
| 2010/0299505 A1 | 11/2010 | Uesugi | |
| 2011/0035570 A1 | 2/2011 | Col | |
| 2011/0264896 A1 * | 10/2011 | Parks | G06F 9/3861 |
| | | | 712/E9.017 |
| 2011/0264897 A1 | 10/2011 | Henry | |
| 2012/0144174 A1 | 6/2012 | Talpes | |
| 2013/0024937 A1 | 1/2013 | Glew et al. | |
| 2013/0125097 A1 | 5/2013 | Ebcioglu et al. | |
| 2013/0179664 A1 | 7/2013 | Olson et al. | |
| 2013/0262841 A1 | 10/2013 | Gschwind | |
| 2014/0047221 A1 | 2/2014 | Irwin | |
| 2014/0208073 A1 | 7/2014 | Blasco-Allue | |
| 2014/0281397 A1 | 9/2014 | Loktyukhn et al. | |
| 2014/0351561 A1 | 11/2014 | Parks | |
| 2015/0039851 A1 | 2/2015 | Uliel | |
| 2015/0089145 A1 | 3/2015 | Steinmacher-Burow | |
| 2016/0004504 A1 | 1/2016 | Elmer | |
| 2016/0147290 A1 | 5/2016 | Williamson et al. | |
| 2016/0179542 A1 | 6/2016 | Lai | |
| 2016/0291974 A1 | 10/2016 | Srinivas et al. | |
| 2016/0378487 A1 | 12/2016 | Ouziel | |
| 2017/0102787 A1 | 4/2017 | Gu et al. | |
| 2017/0123808 A1 | 5/2017 | Caulfield | |
| 2017/0177343 A1 | 6/2017 | Lai | |
| 2018/0129498 A1 | 5/2018 | Levison et al. | |
| 2018/0129501 A1 | 5/2018 | Levison | |
| 2018/0267775 A1 * | 9/2018 | Gopal | G06F 9/30025 |
| 2018/0300131 A1 | 10/2018 | Tannenbaum et al. | |
| 2019/0056943 A1 | 2/2019 | Gschwind et al. | |
| 2019/0102197 A1 | 4/2019 | Kumar et al. | |
| 2019/0108023 A1 | 4/2019 | Lloyd et al. | |
| 2020/0042322 A1 | 2/2020 | Wang et al. | |
| 2020/0402287 A1 | 12/2020 | Shah et al. | |
| 2021/0124582 A1 | 4/2021 | Kerr et al. | |
| 2022/0019436 A1 | 1/2022 | Lloyd et al. | |
| 2022/0035634 A1 | 2/2022 | Lloyd | |

OTHER PUBLICATIONS

J. E. Smith, "Future Superscalar Processors Based on Instruction Compounding," Published 2007, Computer Science, pp. 121-131.

Christopher Celio et al., "The Renewed Case for the Reduced Instruction Set Computer: Avoiding ISA Bloat with Macro-Op Fusion for RISC-V," arXiv:1607.02318v1 [cs.AR] Jul. 8, 2016; 16 pages.

Abhishek Deb et al., "SoftHV : A HW/SW Co-designed Processor with Horizontal and Vertical Fusion," CF'11, May 3-5, 2011, 10 pages.

Ian Lee, "Dynamic Instruction Fusion," UC Santa Cruz Electronic Theses and Dissertations, publication date Dec. 2012, 59 pages.

* cited by examiner

OPERATION FUSION FOR INSTRUCTIONS BRIDGING EXECUTION UNIT TYPES

CROSS-REFERENCE TO RELATED APPLICATIONS

The present application claims priority to U.S. Provisional App. No. 63/376,865 entitled "Operation Fusion for Instructions Bridging Execution Unit Types," filed Sep. 23, 2022, the disclosure of which is incorporated by reference herein in its entirety.

BACKGROUND

Technical Field

This disclosure relates generally to a computer processor and, more specifically, to execution of certain instructions involving data transfer between different types of execution circuits.

Description of the Related Art

Modern computer systems often include processors that are integrated onto a chip with other computer components, such as memories or communications circuits. During operation, those processors execute instructions to implement various software routines, such as user software applications and an operating system. As part of implementing a software routine, a processor normally executes various different types of instructions, such as instructions to generate values needed by the software routine. Instructions executed by a processor may perform operations on data represented using various formats, such as integer format, floating-point format, packed-integer format or packed-floating-point format. Some processor embodiments use separate execution units, or execution circuits, for integer instructions and floating-point instructions. Processors may also use separate execution circuits for vector instructions. In some cases, vector instructions are handled by an execution unit that also handles floating-point instructions.

DETAILED DESCRIPTION

Figure 1:
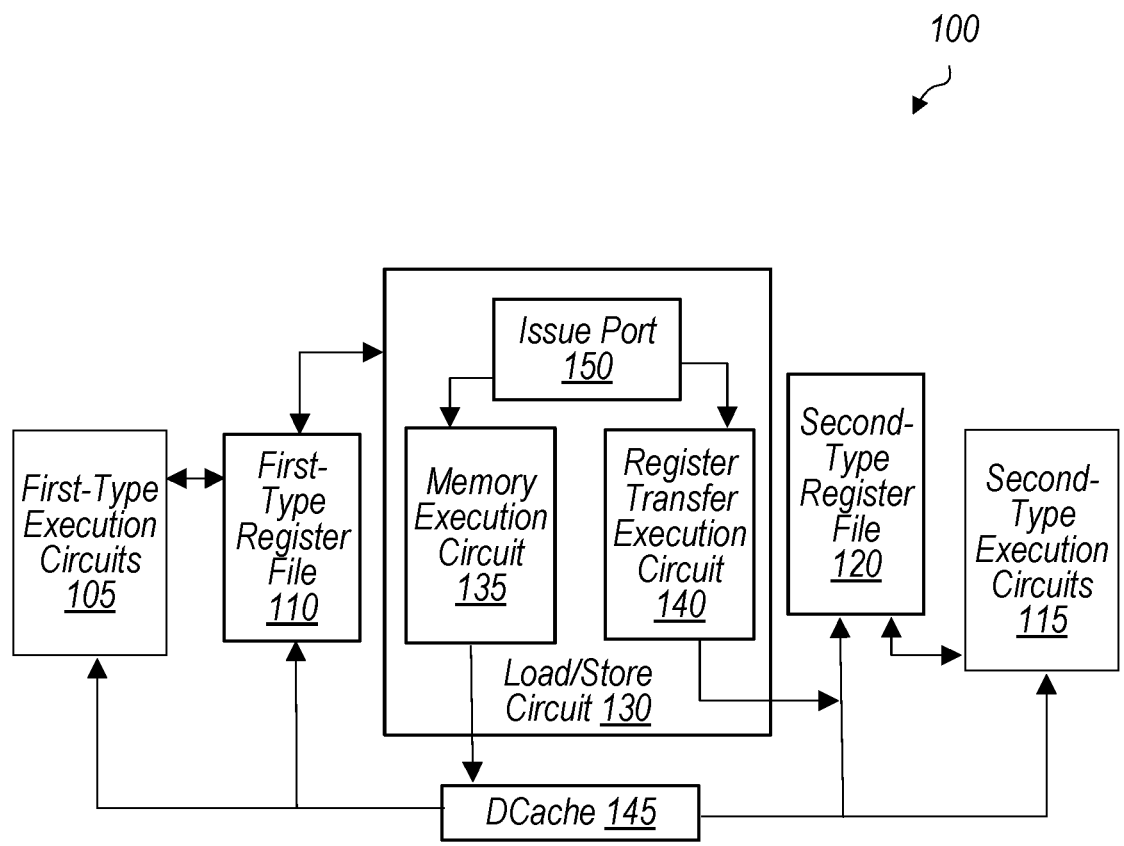
FIG. 1 is a block diagram illustrating example elements of a processor configured to execute certain instruction operations in a load/store circuit, according to some embodiments.

As mentioned above, modern processors often have separate execution units, or execution circuits, for handling different types of values. For example, an integer execution circuit is often separate from vector and/or floating-point execution circuits. In an embodiment, such separate execution circuits have associated register files, which may not be readily accessible by other types of execution circuit. For example, an integer register file is in some embodiments not directly accessible by a floating-point execution circuit, and vice versa. As used herein, a register file is directly accessible by an execution circuit if the execution circuit, or an issue port or reservation station associated with the execution circuit, can read a value from the register file. In an embodiment, when a register file of a processor is directly accessible by an execution circuit the processor includes a data bus from the register file to the execution circuit. In some processors, there is not a data bus between a register file of a first type and an execution circuit of a different type. Adding additional bus connections to a processor may be prohibitively expensive, particularly if instructions requiring access across boundaries between types of execution circuit are needed relatively rarely as compared to instructions employing execution units and register files of the same type.

Limitations as described above on communication between different types of execution circuits can complicate execution of instructions involving transfer of data between a register file for one type of execution circuit and a register file for a different type of execution circuit. Often these instructions are decoded into instruction operations that utilize a load/store circuit of the processor. In a processor having execution circuits of different types, a load/store circuit is often configured to access a register file, such as a register file including general-purpose registers, associated with one of the execution circuit types, and output values to either of the execution circuit types. The load/store circuit can therefore function as a kind of bridge between the execution units. For example, an instruction to take an integer value from an integer register file, convert it to a floating-point value and store it in a floating-point register file may be decoded as two operations: one operation, for the load/store circuit, of reading the integer value and passing it down the load/store pipeline to the floating-point execution circuit, and another operation, for the floating-point execution circuit, of performing the conversion and storing the converted value. The load/store circuit operation is essentially a "dummy load operation" and can be inefficient in this case because the load/store pipeline includes multiple operations, such as address translation, data tag lookup and data cache read, that are not needed for the conversion instruction and only serve to add additional clock cycles to the execution time before the actual conversion operation, in the floating-point execution circuit, even begins.

Even when instructions involving data transfer between register files of different types are used relatively rarely in the full range of processor operation, such instructions may be used quite often in particular applications. Performance of such applications may therefore be significantly degraded by the increased latency of the "dummy load operation" described above. It may therefore be desirable to perform instructions involving data transfer between register files for different types of execution circuit in a more efficient manner such that, for example, the overall execution latency is reduced. In particular, it may be desirable to more efficiently execute instructions that specify a transfer of data between the different types of register file and also specify an operation to be performed on or using the data. Accordingly, the present disclosure addresses, among other things, the technical problems pertaining to performing such instructions in a more efficient manner.

The present disclosure describes techniques for execution using a processor's load/store circuit of instructions specifying a transfer of data between register files for different types of execution circuit and further specifying an operation to be performed using the data. The inventors have recognized that certain instruction operations (decoded instructions) corresponding to this type of instruction can advantageously be executed in the load/store circuit of a processor. In an embodiment, parallel execution paths are implemented in the load/store circuit, with a first execution path implemented by a memory execution circuit and a second, parallel execution path implemented by a register transfer execution circuit. The memory execution circuit is configured to perform memory operations that may typically be performed by a load/store circuit, such as load or store operations specifying access to memory or a data cache. The register transfer execution circuit is configured to execute instruction operations specifying a transfer of data between register files for different types of execution circuit and further specifying an operation to be performed using the data. In an embodiment, the register transfer execution circuit includes a replicated version of execution logic also appearing in one or more of the processor's execution circuits.

In an embodiment, an instruction specifying a transfer of data between register files for different types of execution circuit and further specifying an operation to be performed using the data is decoded by the processor in such a way that a decoded instruction is sent to the processor's load/store circuit for execution using the register transfer execution circuit. One example of such an instruction is an instruction for converting an integer value from an integer register file to a floating-point value and storing the floating-point value in a floating-point register file. In such an embodiment the register transfer execution circuit in the load/store circuit includes an integer-to-floating-point conversion circuit. This type of embodiment is further illustrated in FIGS. 4A and 6. Another example of an instruction specifying a transfer of data between register files of different types and further specifying an operation to be performed using the data is an instruction for duplicating a scalar value from a scalar register file to one or more vector elements of a vector value and storing the vector value in a vector register file. A register transfer execution circuit for executing such an instruction includes a duplication circuit. Such an embodiment is further illustrated in FIGS. 4B and 7.

In an embodiment, execution of certain instructions in the load/store circuit as described herein allows execution of such an instruction within fewer clock cycles than are used for a combination of a dummy load operation in the load/store circuit and subsequent operation execution in an execution circuit separate from the load/store circuit. In some cases, execution of the instruction in the load/store circuit may be completed in the time that would previously have been needed just to get the value to be operated on from a register file of a first type to an execution circuit or register file of a second type. Moreover, techniques as described herein may result in a pair of instruction operations (one "dummy load" operation for the load/store unit and one operation on the result of the dummy load for the execution unit receiving the result) being replaced with a single instruction operation executed in the load/store unit. Aside from any latency benefits, replacing two instruction operations with one (which may be referred to as "fusing" the instruction operations) can reduce the amount of resources that would otherwise be consumed by processing and executing an additional instruction operation. For example, an entry of a re-order buffer may be saved by storing one instead of two instruction operations and an additional physical register may not need to be allocated. As another example, dispatch bandwidth (a number of instruction operations dispatched to a reservation station per cycle) and issue bandwidth (a number of instruction operations scheduled to an execution unit per cycle) are lowered by reducing the number of instruction operations. More efficient and/or lower-power operation of the processor at multiple stages may therefore result from fusion of instruction operations.

FIG. 1 is a block diagram illustrating example elements of a processor configured to execute certain instructions in a load/store circuit according to embodiments described herein. In the illustrated embodiment, processor 100 includes execution circuits 105 of a first type which are coupled to register file 110 for storing values of the first type. A type of execution circuit, register file or value as used herein may include, for example, integer, floating-point, scalar or vector types. Processor 100 also includes execution circuits 115 of a second type which are coupled to register file 120 of the second type. In one embodiment, execution circuits 105 are integer execution circuits (the first type is integer) and execution circuits 115 are floating-point execution circuits (the second type is floating-point). Execution circuits 105 or 115 may also be vector execution circuits in some embodiments, configured to use vector operands which may have any of various formats, such as packed-integer or packed-floating-point formats. In a further embodiment, execution circuits 105 or 115 may include both floating-point and vector execution circuits. Embodiments for which the first type is integer and the second type is floating-point and/or vector are illustrated in FIGS. 2, 4A-4B and 6-7.

Figure 2:
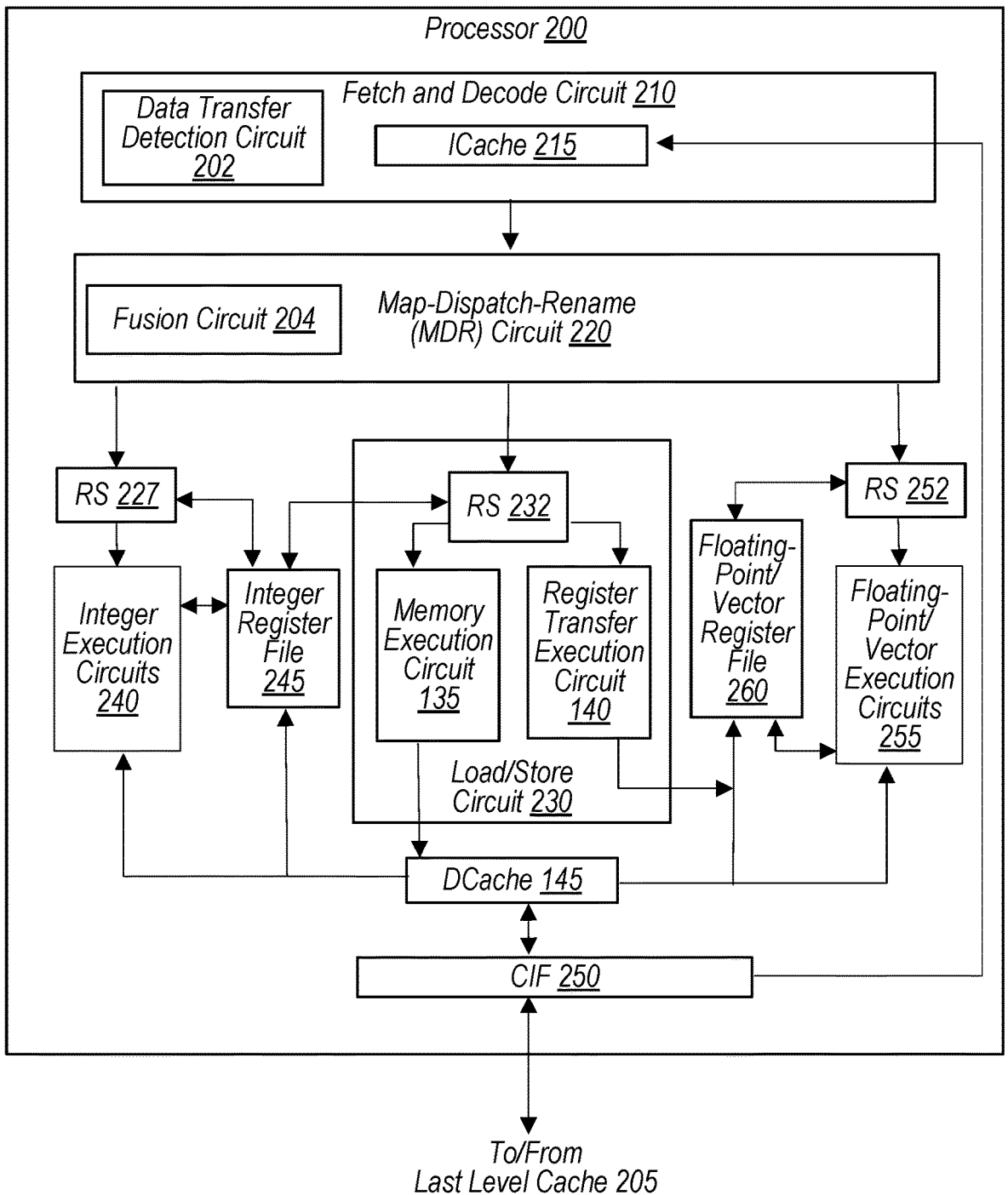
FIG. 2 is a block diagram illustrating additional example elements of a processor that is configured to execute certain instruction operations in a load/store circuit, according to some embodiments.
Figure 4A:
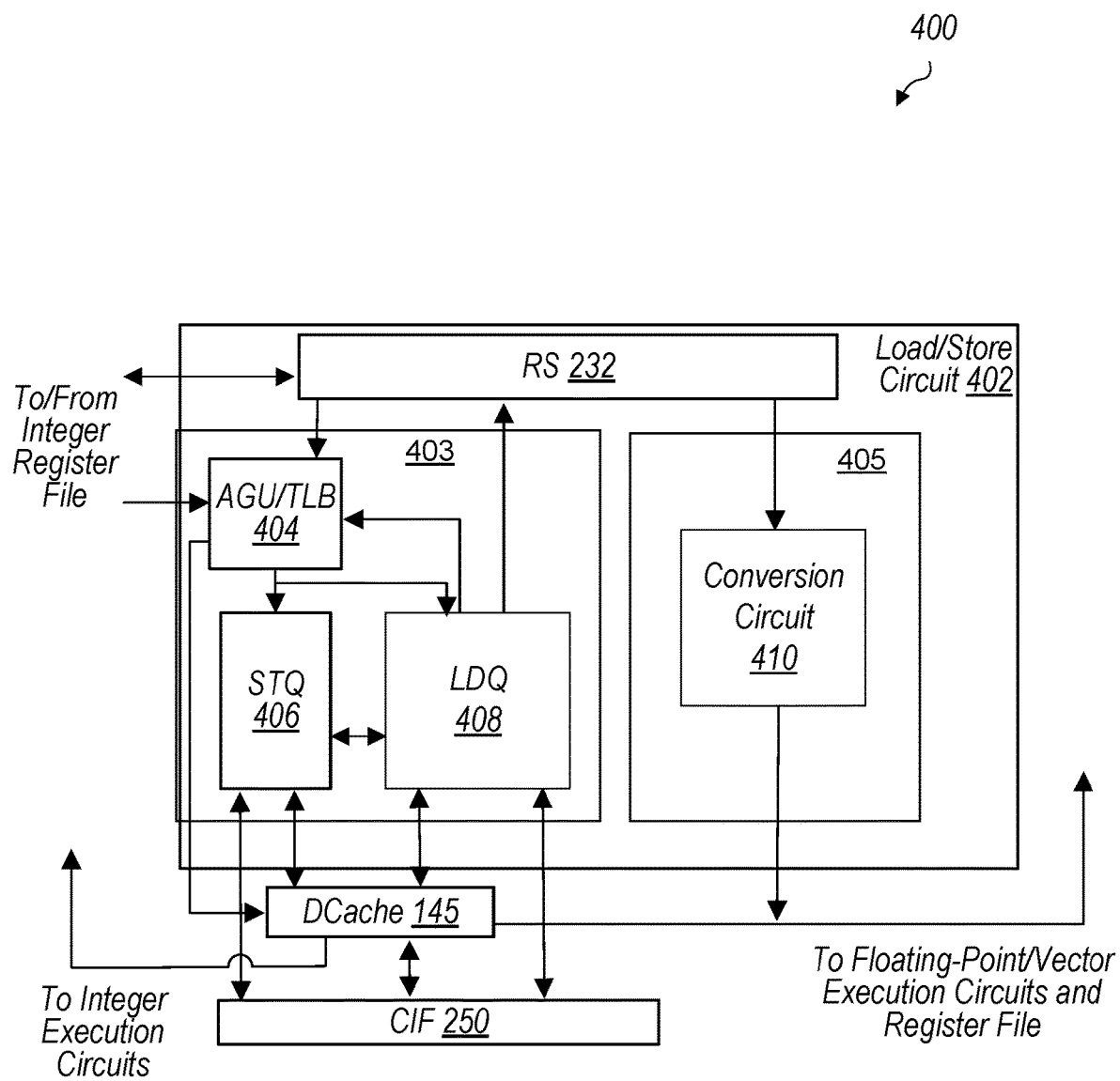
FIG. 4A is a block diagram illustrating example elements of a processor configured to execute a conversion instruction operation in a load/store circuit, according to some embodiments.
Figure 4B:
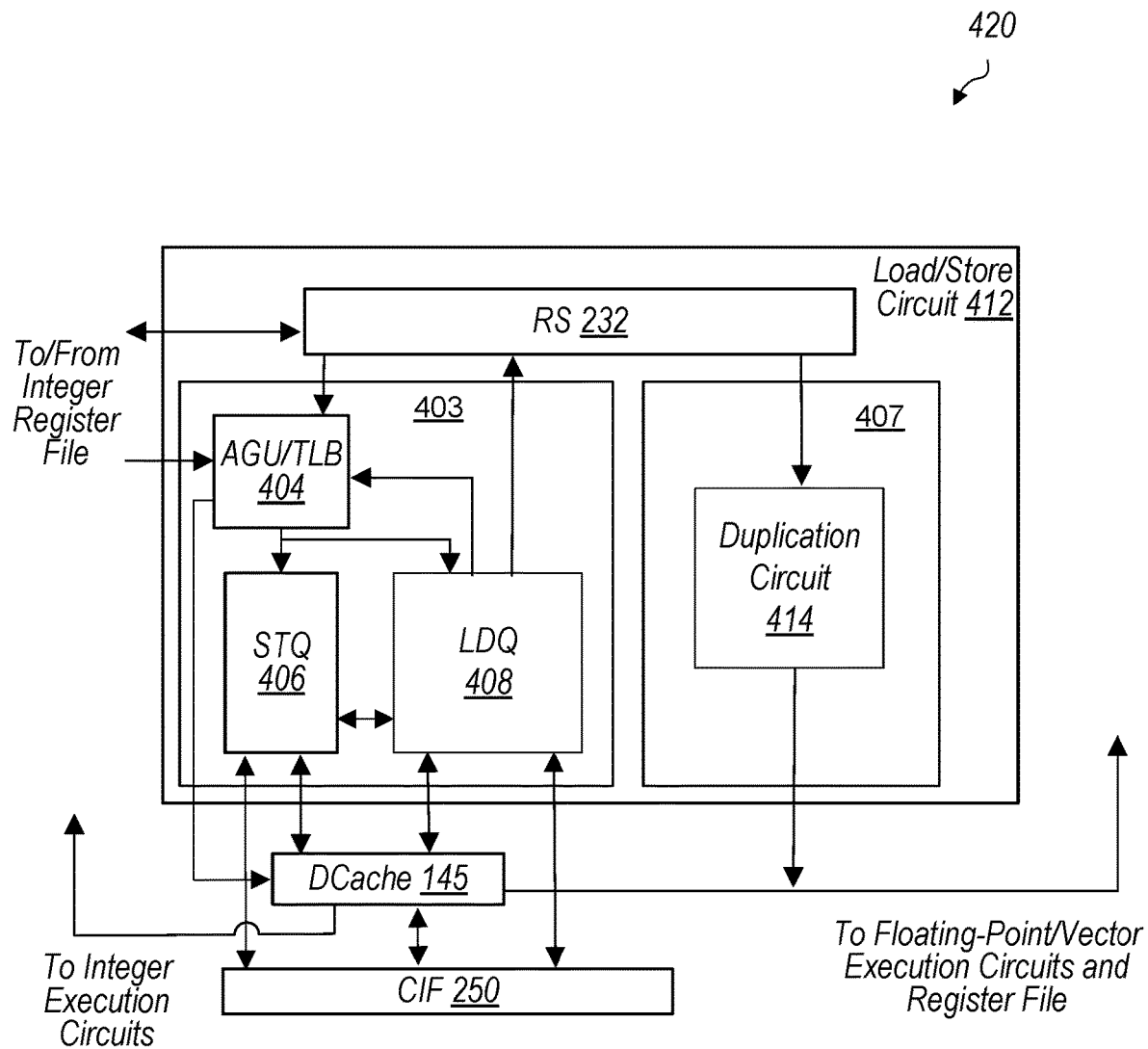
FIG. 4B is a block diagram illustrating example elements of a processor configured to execute a duplication instruction operation in a load/store circuit, according to some embodiments.

Processor 100 of FIG. 1 also includes a load/store circuit 130. Load/store circuit 130 includes an issue port 150 configured to feed instruction operations to either memory execution circuit 135 or register transfer execution circuit 140. In an embodiment, issue port 150 serves as an input circuit that receives instruction operations to be executed by load/store circuit 130 and issues them to the appropriate execution circuit. In some embodiments, issue port 150 is implemented as a reservation station, in a way similar to that illustrated in FIGS. 2 and 4A-4B. In the embodiment of FIG. 1, load/store circuit 130 is coupled to first-type register file 110. In an embodiment, load/store circuit 130 can directly access register file 110 through a reservation station, as illustrated in FIGS. 2 and 4A-4B. Load/store circuit 130 is also coupled to second-type execution circuits 115 and register file 120 (as well as first-type execution circuits 105 and register file 110) via an output result bus. For execution using memory execution circuit 135, an output path of load/store circuit 130 includes data cache ("DCache") 145 in the embodiment of FIG. 1. For execution using register transfer execution circuit 140, an output path from load/store circuit 130 to second-type register file 120 bypasses DCache 145 in the embodiment of FIG. 1. The output path from register transfer execution circuit 140 may include DCache 145 and/or other caches in other embodiments.

In an embodiment, second-type register file 120 is directly accessible by second-type execution circuits 115, but first-type register file 110 is not directly accessible by second-type execution circuits 115. Because load/store circuit 130 can directly access first-type register file 110 and has an output path to both first-type register file 110 and second-type register file 120, load/store circuit 130 can function as a bridge between the first-type and second-type sides of processor 100.

FIG. 2 is a block diagram illustrating additional example elements of an embodiment of a processor configured to execute certain instructions in a load/store circuit. In the embodiment of FIG. 2, processor 200 includes integer execution circuits and floating-point/vector execution circuits. Integer execution circuits 240 and integer register file 245 are examples of first-type execution circuits 105 and first-type register file 110, respectively, of FIG. 1. Floating-point/vector execution circuits 255 and floating-point/vector register file 260 are examples of second-type execution circuits 115 and second-type register file 120, respectively, of FIG. 1. "Floating-point/vector" as used herein to describe a circuit or register is intended to describe a circuit or register configured for use with scalar floating-point operands, vector operands (which may be in integer or floating-point format in various embodiments), or both of these types of operands.

In addition to the execution circuits and register files, processor 200 includes a fetch and decode circuit 210, a map-dispatch-rename (MDR) circuit 220, a set of reservation stations (RSs) 227 and 252 for the integer and floating-point vector execution circuits, respectively, a load/store circuit 230, DCache 145 and a core interface unit (CIF) 250. As depicted, fetch and decode circuit 210 includes a data transfer detection circuit 202 and an instruction cache, or "ICache", 215 and is coupled to MDR circuit 220, which includes a fusion circuit 204 and is coupled to RS 227. RS 252 and load/store circuit 230 (via reservation station 132). Processor 200 may include additional elements not shown in FIG. 2.

Fetch and decode circuit 210, in various embodiments, is configured to fetch instructions for execution by processor 200 and decode the instructions into instruction operations (briefly "ops") for execution. More particularly, fetch and decode circuit 210 may be configured to cache instructions fetched from a memory (e.g., memory 810 of FIG. 8) through an external interface such as CIF 250 into ICache 215, and may fetch a speculative path of instructions for processor 200. Fetch and decode circuit 210 may implement various prediction structures for predicting the fetch path, such as one that predicts fetch addresses based on previously executed instructions. As used herein an "instruction" is an executable entity defined in an ISA implemented by a processor such as processor 200. In various embodiments, fetch and decode circuit 210 may decode an instruction into multiple ops depending on the complexity of that instruction. Particularly complex instructions may be microcoded. In such embodiments, the microcode routine for an instruction may be coded in ops. In other embodiments, however, each instruction within the instruction set architecture implemented by processor 200 may be decoded into a single op, and thus the op can be synonymous with its corresponding instruction (although it may be modified in form by the decoder). Accordingly, the term "instruction operation" or "op" may be used herein to refer to an operation that an execution circuit in a processor is configured to execute as a single entity.

In various embodiments, fetch and decode circuit 210 is configured to identify candidate instructions for dispatch as instruction operations for execution using register transfer execution circuit 140 in load/store circuit 230 and provide an indication of those candidate instructions to MDR circuit 220. Dispatch of an instruction operation for execution using register transfer execution circuit 140 may be referred to as "instruction operation fusion" herein. In an embodiment, the candidate instructions are instructions specifying a transfer of data between integer register file 245 and floating-point/vector register file 260 and further specifying an operation to be performed using the data. In some embodiments conditions may be applied to determine whether an instruction (and the instruction operations it is decoded into) is eligible for instruction operation fusion. Fetch and decode circuit 210 may in some embodiments decode the candidate instruction into a dummy load instruction and an operation instruction suitable for execution in the absence of instruction operation fusion but mark the instruction operations as eligible for fusion by MDR circuit 220 into an instruction operation for execution using register transfer circuit 140. Such an embodiment may carry out the instruction operation fusion using a combination of data transfer detection circuit 202 in fetch and decode circuit 210 and fusion circuit 204 in MDR 220.

MDR circuit 220, in various embodiments, is configured to map ops received from fetch and decode circuit 210 to speculative resources (e.g., physical registers) in order to permit out-of-order and/or speculative execution. As shown, MDR circuit 220 can dispatch the ops to any of RS 227, RS 132 and RS 252. The ops may be mapped to physical registers in integer register file 245 or floating-point/vector register file 260 from the architectural registers used in the corresponding instructions. That is, register file 245 or 260 may implement a set of physical registers that are greater in number than the architectural registers specified by the instruction set architecture implemented by processor 200. As such, MDR circuit 220 may manage a mapping between the architectural registers and the physical registers. As shown, there may be separate physical registers for different operand types (e.g., integer, floating-point, etc.). The physical registers, however, may be shared between different operand types in some embodiments. MDR circuit 220, in various embodiments, tracks the speculative execution and retires ops (or flushes misspeculated ops). In various embodiments, a reorder buffer (not shown) is used in tracking the program order of ops and managing retirement/flush.

In various embodiments, MDR circuit 220 is configured to use fusion circuit 204 to fuse eligible instruction operation pairs that are marked by fetch and decode circuit 210 if certain criteria are met. While fusion of instruction operations occurs at MDR circuit 220 in various embodiments, in some embodiments fusion occurs at a different stage in the instruction pipeline, such as in fetch and decode circuit 210. That is, the circuitry used to perform the fusion of instructions may reside at different stages of the instruction pipeline in different implementations.

Load/store circuit 230, in various embodiments, is configured to execute, using memory execution circuit 135, memory ops received from MDR circuit 220. Load/store circuit 230 is further configured to execute, using register transfer execution circuit 140, fused instruction operations received from MDR circuit 220 as described herein. Reservation station 232 in load/store circuit 230 is an example implementation of issue port 150 in FIG. 1 and is configured to receive incoming instruction operations and send them to either memory execution circuit 135 or register transfer execution circuit 140, as appropriate. Generally, a memory op is an instruction op specifying an access to memory (such as memory 810 of FIG. 8), although that memory access may be completed in a cache such as DCache 145. As such, a load memory op may specify a transfer of data from a memory location to a register of processor 200, while a store memory op may specify a transfer of data from a register to a memory location. Load memory ops can be referred to as load ops or loads, and store memory ops can be referred to as store ops or stores. In various cases, the instruction set architecture implemented by processor 200 permits memory accesses to different addresses to occur out of order but may require memory accesses to the same address (or overlapping addresses, where at least one byte is accessed by both overlapping memory accesses) to occur in program order.

Load/store circuit 230 may implement multiple load pipelines ("pipes") using memory execution circuit 135. As an example, three load pipelines may be implemented, although more or fewer pipelines can be implemented in other cases. Each pipeline may execute a different load, independent and in parallel with other loads in other pipelines. Consequently, reservation station 232 may issue any number of loads up to the number of load pipes in the same clock cycle. Similarly, load/store circuit 230 may further implement one or more store pipes using memory execution circuit 135. In some embodiments, the number of store pipes is not equal to the number of load pipes. For example, two store pipes may be used instead of three store pipes. Likewise, reservation station 232 may issue any number of stores up to the number of store pipes in the same clock cycle.

Load/store ops, in various embodiments, are received at reservation station 232, which may be configured to monitor the source operands of the load/store ops to determine when they are available and then issue the ops to the load or store pipelines, respectively. Some source operands may be available when the instruction operations are received at reservation station 232, which may be indicated in the data received by reservation station 232 from MDR circuit 220 for the corresponding instruction operation. Other operands may become available via execution of instruction operations by execution circuits such as integer execution circuits 240 or even via execution of earlier load ops. The operands may be gathered by reservation station 232 or may be read from a register file such as integer register file 245 upon issue from reservation station 232 as shown in FIG. 2. In some embodiments, reservation station 232 is configured to issue load/store ops out of order (from their original order in the code sequence being executed by processor 200) as the operands become available.

Register transfer execution circuit 140 is configured to perform an operation specified by a fused instruction operation as described herein. In the embodiment of FIG. 2, the operation is performed using data from integer register file 245 and a result of the operation is written to floating-point/vector register file 260. In some embodiments, the operation is an integer-to-floating-point conversion and circuit 140 includes an integer-to-floating-point conversion circuit. In some embodiments, the operation is a duplication operation across multiple vector elements and circuit 140 includes a duplication circuit. Register transfer execution circuit 140 may be configured to selectively perform any of multiple operations in various embodiments. In an embodiment, one or more circuits within register transfer execution circuit 140 are similar to or replicated from circuits within floating-point/vector execution circuits 255.

ICache 215 and DCache 145, in various embodiments, may each be a cache having any desired capacity, cache line size, and configuration. A cache line may be allocated/deallocated in a cache as a unit and thus may define the unit of allocation/deallocation for the cache. Cache lines may vary in size (e.g., 32 bytes, 64 bytes, or larger or smaller). Different caches may have different cache line sizes. There may further be more additional levels of cache between ICache 215/DCache 145 and a main memory, such as a last level cache. In various embodiments, ICache 215 is used to cache fetched instructions and DCache 145 is used to cache data fetched or generated by processor 200. CIF 250, in various embodiments, is responsible for communicating with the rest of the system that includes processor 200, on behalf of processor 200. For example, CIF 250 may be configured to request data for ICache 215 misses and DCache 145 misses. When the data is returned, CIF 250 may then signal the cache fill to the corresponding cache.

Integer execution circuits 240 are configured to execute various defined operations (such as arithmetic operations, logical operations, shift or rotate operations, etc.) on integer operands. Floating-point/vector execution circuits 255 are configured to execute various defined operations on one or both of floating-point operands or vector operands (including packed-integer or packed-floating-point operands). As such, each execution circuit 240 or 255 may comprise hardware configured to perform the operations defined for the ops that that execution circuit is defined to handle. Execution circuits 240 (or 255) may generally be independent of each other in that each execution circuit may be configured to operate on an op that was issued to that execution circuit without dependence on other execution circuits 240 (or 255). Different execution circuits within circuits 240 or circuits 255 may have different execution latencies (e.g., different pipe lengths). Any number and type of execution circuits 240 (or 255) may be included in various embodiments, including embodiments having one execution circuit 240 (or 255) and embodiments having multiple execution circuits 240 (or 255).

Figure 3A:
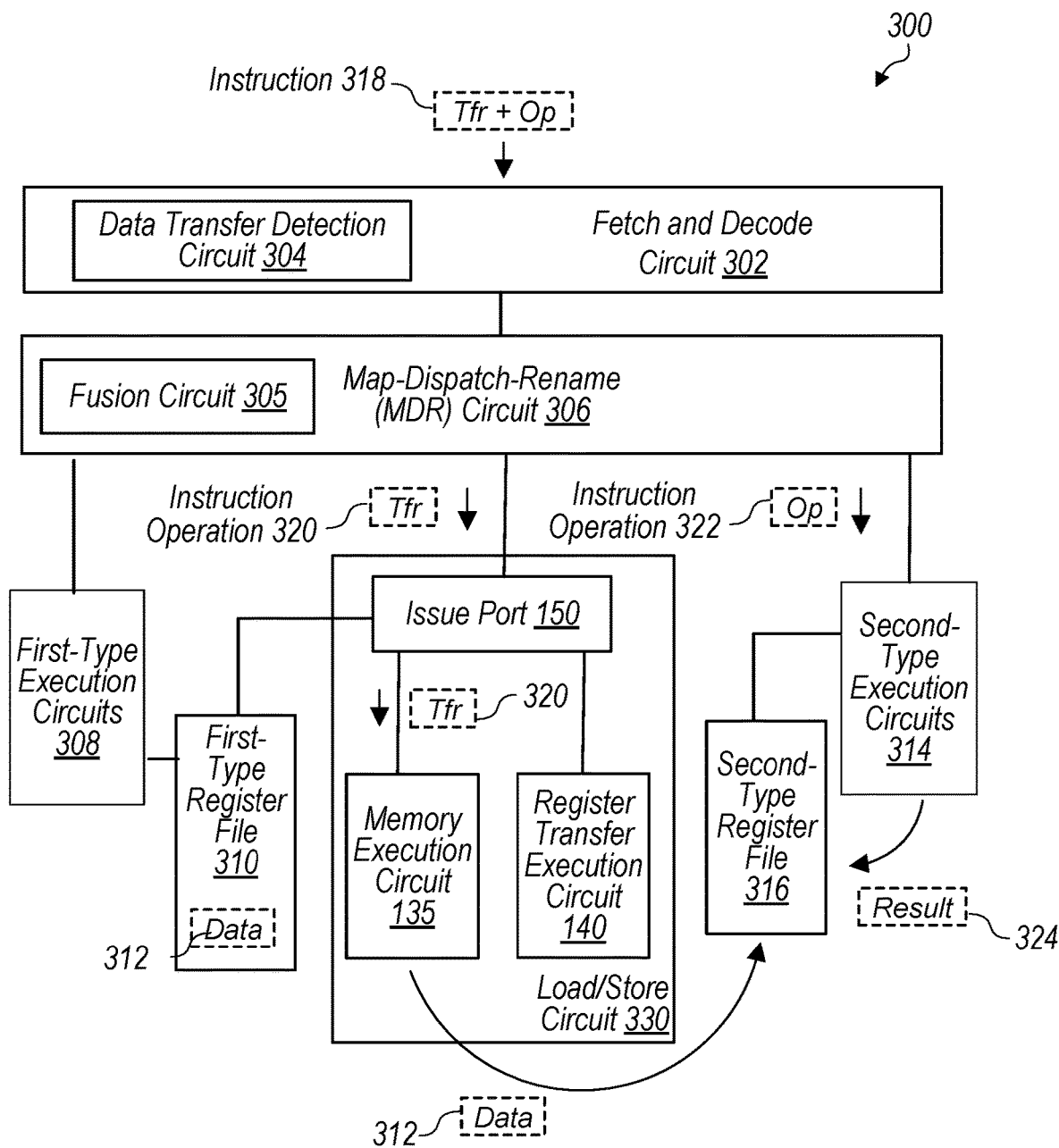
FIG. 3A is a block diagram illustrating decoding of an instruction into two instruction operations for execution in different areas of a processor, according to certain embodiments.

FIG. 3A illustrates an example of instruction decoding and execution in a processor similar to that of FIG. 2 for a case in which an instruction is decoded into two instruction operations for execution in different areas of the processor. The embodiment of FIG. 3A is an example of instruction execution in the absence of the instruction operation fusion described herein. The process of FIG. 3A could occur in a processor not including the elements of processor 300 related to instruction operation fusion, such as data transfer detection circuit 304, fusion circuit 305, and register transfer execution circuit 140. This process may also occur in processors configured for instruction operation fusion in the case of instructions not selected by the processor for fused execution.

Processor 300 of FIG. 3A includes fetch and decode circuit 302, MDR circuit 306, load/store circuit 330, first-type execution circuits 308, first-type register file 310, second-type execution circuits 314 and second-type register file 316. Certain processor elements useful for explanation of this example are shown in FIG. 3A; additional elements of a processor, including some of the elements shown in the example of FIG. 2, have been omitted for clarity. Elements of processor 300 are similar to corresponding elements of processor 100 of FIG. 1 and/or processor 200 of FIG. 2 as described above. Data, instructions, and instruction operations are depicted using dashed lines in FIG. 3A, while hardware elements are drawn with solid lines. Multiple points in time are illustrated in FIG. 3A as instructions, instruction operations, data and/or results are shown moving between elements of the processor as indicated by arrows.

As illustrated in FIG. 3A, instruction 318 is received at fetch and decode circuit 302. Instruction 318 specifies a transfer (indicated by "Tfr") of data between first-type register file 310 and second-type register file 316 and further specifies an operation (indicated by "Op") to be performed using the data. The data to be transferred is depicted as data 312 in first-type register file 310. Instruction 318 is decoded into instruction operations 320 and 322. Instruction operation 320, labeled "Tfr" to indicate an instruction operation to implement the data transfer portion of instruction 318, is dispatched by MDR circuit 306 to issue port 150 of load/store circuit 330, for execution by memory execution circuit 135. Instruction operation 322, labeled "Op" to indicate an instruction operation to implement the operation portion of instruction 318, is dispatched by MDR circuit 306 to second-type execution circuits 314 for execution.

In an embodiment, instruction 318 is decoded into instruction operations 320 and 322 by fetch and decode circuit 302 as part of a non-fused execution process initiated in response to a determination by data transfer detection circuit 304 that instruction 318 is not eligible for fused execution. Data transfer detection circuit 304 may determine candidate instructions for instruction operation fusion using one or more of multiple factors in various embodiments, such as whether an operation specified by instruction 318 is supported by register transfer execution circuit 140 or whether instruction 318 is a type of instruction designated for fused execution. In another embodiment, instruction 318 is determined to be eligible for fused execution but instruction operations 320 and 322 are not fused into a single instruction operation by MDR 306. Fusion circuit 305 may determine whether to fuse eligible instruction operations using one or more of multiple factors in various embodiments, such as relative availabilities of pipelines implemented by register transfer execution circuit 140, memory execution circuit 135 and second-type execution circuits 314.

Issue port 150 is configured to select memory execution circuit 135 for execution of instruction operation 320. In an embodiment, instruction operation 320 is associated with an indicator, such as one or more specified bit values, of execution by memory execution circuit 135 rather than by register transfer execution circuit 140. Execution of instruction operation 320 by issue port 150 and memory execution circuit 135 reads data 312 from first-type register file 310 and moves data 312 along a load pipe for sending it to second-type register file 316. Once data 312 becomes available to second-type execution circuits 314, execution circuits 314 performs the specified operation on data 312 to produce result 324 which is written to second-type register file 316.

Figure 3B:
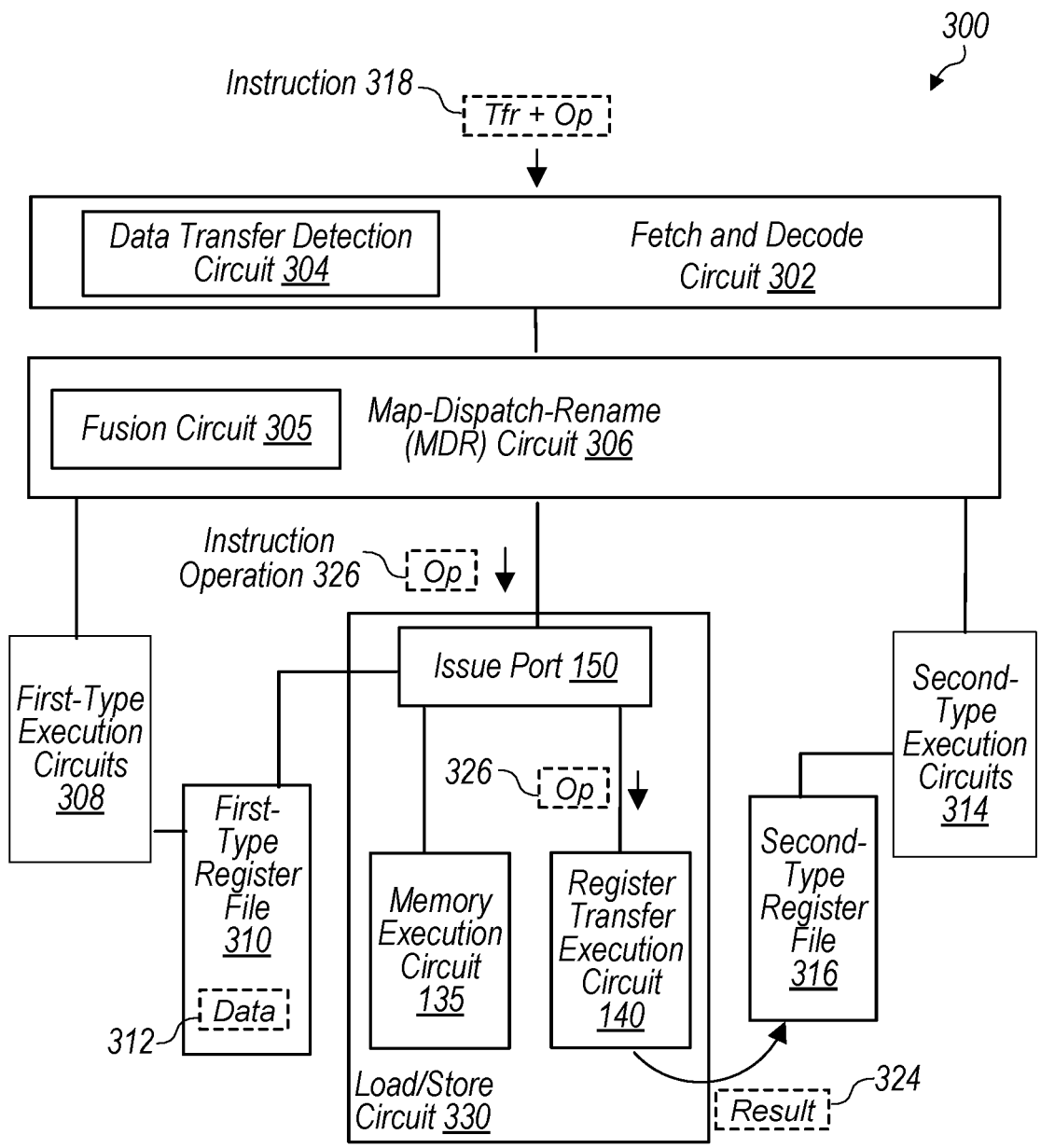
FIG. 3B is a block diagram illustrating decoding of an instruction into an instruction operation for execution in an execution circuit within a load/store circuit, according to certain embodiments.

FIG. 3B illustrates an example of instruction decoding and execution in a case in which an instruction is decoded into an instruction operation for execution in a register transfer execution circuit within a load/store circuit of the processor. In the embodiment of FIG. 3B, instruction 318 is received by fetch and decode circuit 302 of processor 300 as also illustrated in FIG. 3A. Instead of being decoded into two instruction operations as in FIG. 3A, however, instruction 318 in FIG. 3B is decoded into a single instruction operation 326.

In an embodiment, data transfer detection circuit 304 identifies instruction 318 as an instruction eligible for fused instruction operation execution as described herein. Data transfer detection circuit 304 may identify candidate instructions using various criteria in various embodiments. For example, circuit 304 may be configured to detect instructions performing an operation using data from first-type register file 310 and providing a result to second-type register file 316. Data transfer detection circuit 304 may also determine that an operation specified by instruction 318 is supported by register transfer execution circuit 140. In some embodiments, circuit 304 may detect instructions that have been specifically designated as eligible for instruction operation fusion. Fetch and decode circuit 302 may in some embodiments decode instruction 318 into two instruction operations similar to instruction operation 320 and 322 of FIG. 3A (not shown in FIG. 3B) and forward the two instruction operations to MDR circuit 306 for possible fusion into single instruction operation 326. In such an embodiment one or both of the instruction operations is associated with an indicator of eligibility for instruction operation fusion. Such an indicator of eligibility may be carried by an instruction operation, such as by a set flag or other specified bit value, or may be passed to MDR circuit 306 in a different packet or payload and associated with an instruction operation using, for example, the instruction operation's decode lane.

When instruction operations eligible for fusion into a single instruction operation are received at MDR circuit 306, fusion circuit 305 determines, in various embodiments, whether the instruction operations should be fused. In an embodiment, the determination includes checking an availability of register transfer execution circuit 140. In the embodiment of FIG. 3B, MDR circuit 306 dispatches fused instruction operation 326 to issue port 150. Although similarly labeled "Op" to indicate that it is executable to perform an operation, instruction operation 326 differs from instruction operation 322 of FIG. 3A in, for example, where it is to be executed and where it obtains data 312. Instruction operation 326 is executable, in register transfer execution circuit 140 of load/store circuit 330, to perform an operation using data 312 read from first-type register file 312 and make the result of the operation available to second-type execution circuits 314. In the embodiment of FIG. 3B, result 324 is written to second-type register file 316. Issue port 150 recognizes instruction operation 326 as intended for execution by register transfer execution circuit 140 rather than memory execution circuit 135. Issue port 150 accordingly sends instruction operation 326 for execution by register transfer execution circuit 140, which performs the operation specified by the instruction operation and provides result 324 to second-type register file 316. In an embodiment, instruction operation 326 is associated with an indicator that it is for execution by register transfer execution circuit 140.

Such an indicator may be carried by instruction operation 326, such as by a set flag or other specified bit value, or may be passed to load/store circuit 330 using a separate packet or payload.

Comparison of the instruction, and instruction operation, flows of FIG. 3A and FIG. 3B shows that the flow of FIG. 3B can be seen as "fusing" the two instruction operations 320 and 322 of FIG. 3A into the single instruction operation 326 of FIG. 3B. Addition of register transfer execution circuit 140 to load/store circuit 330 allows execution of instruction 318 in a way that avoids the latency incurred by waiting for instruction operation 320 of FIG. 3A to pass through the load pipeline of memory execution circuit 135 before second-type execution circuits 314 can access data 312 to perform instruction operation 322. In some embodiments, execution of instruction operation 326 can complete and forward result 324 to second-type register file 316 in the time that it would take for memory execution circuit 135 to get data 312 to second-type register file 316 in the process of FIG. 3A. In addition to the potential latency benefits, the process of FIG. 3B may save computing resources and bandwidth compared to the process of FIG. 3A because only one instruction operation (326) is dispatched from MDR circuit 306 and executed, rather than two (320 and 322). For example, the process of FIG. 3B may avoid allocation of a register in second-type register file 316 for data 312, while such a register may be used in the process of FIG. 3A for execution of instruction operation 322.

The process described above in connection with FIG. 3B is an example embodiment of instruction operation fusion to produce an instruction operation 326 for execution in a register transfer execution circuit of a processor's load/store circuit. Multiple possible alternatives and variations will be understood by one of ordinary skill in the art of processor design in view of this disclosure. For example, detection of eligible instructions, decoding into instruction operations and fusing of instruction operations may be distributed differently between a fetch and decode circuit and an MDR circuit in some embodiments. Detection and fusion may both be performed within a fetch and decode circuit, for example, so that instruction 318 could be decoded into instruction operation 326 by fetch and decode circuit 302.

FIG. 4A is a block diagram illustrating example elements of an embodiment of a processor configured to execute a conversion instruction in its load/store circuit. Elements of processor 400 shown in FIG. 4A include load/store circuit 402, DCache 145 and CIF 250. Certain processor elements useful for explanation of this example are shown in FIG. 4A; additional elements of a processor, including some of the elements shown in the examples of FIGS. 1-3B, have been omitted for clarity. Elements of processor 400 are similar to corresponding elements of processor 100 of FIG. 1 and/or processor 200 of FIG. 2 as described above. In the embodiment of FIG. 4A, load/store circuit 402 is coupled between integer execution circuits and floating point/vector execution circuits in a manner similar to that shown in processor 200 of FIG. 2. Load/store circuit 402 could more generally be coupled between first-type execution circuits and second-type execution circuits in other embodiments.

Load/store circuit 402 includes reservation station 232, memory execution circuit 403 and register transfer execution circuit 405. Memory execution circuit 403 represents an embodiment of memory execution circuit 135 in FIGS. 1-3B and register transfer execution circuit 405 represents an embodiment of register transfer execution circuit 140 in the same drawings. As illustrated, memory transfer circuit 403 includes an address generation unit/translation lookaside buffer (AGU/TLB) 404, a store queue (STQ) 406 and a load queue (LDQ) 408. Memory ops, such as load/store ops, are issued to memory transfer circuit 403 by reservation station 232. AGU/TLB 404, in various embodiments, is configured to generate the address accessed by a load/store op when the load/store op is sent from reservation station 232. AGU/TLB 404 may further be configured to translate that address from an effective or virtual address created from the address operands of the load/store op to a physical address that may actually be used to address memory. In some embodiments, AGU/TLB 404 is configured to generate an access to DCache 145. Store queue 406, in various embodiments, track store ops from initial execution to retirement by load/store circuit 402 and may be responsible for ensuring that the memory ordering rules are not violated. Load queue 408 has a similar function for load ops.

In the case of a "dummy load" op used to move data from a first-type register file to a second-type register file, operations such as address translation or accessing of the data cache are generally not needed for passing the data from the first-type register file through the load pipeline to the second-type register file. In an embodiment, at least three clock cycles are used in passing such dummy load data through memory execution circuit 403. For example, three clock cycles may be used in which a regular load op would do address translation, data tag lookup to identify a particular block of data, and data cache read. Execution using a register transfer execution circuit, such as register transfer execution circuit 405, of a fused instruction operation for instructions which would otherwise be decoded into two ops, including a dummy load op, can save cycles that would be essentially wasted in memory execution circuit 403.

In the embodiment of FIG. 4A, register transfer execution circuit 405 includes a conversion circuit 410. In an embodiment, a received instruction, such as instruction 318 of FIG. 3B, is executable to convert an integer value from an integer register file to a floating-point value and store the floating-point value in a floating-point register file. Conversion circuit 410 is configured to carry out the conversion when such an instruction is decoded into a fused instruction operation for execution in register transfer execution circuit 405. In an embodiment, register transfer execution circuit 405 is configured to store the result of the conversion in the register file configured to store the converted value (a floating-point register file, in the case of an integer-to-floating-point conversion). In an embodiment, conversion circuit 410 is a replica of a conversion circuit used in execution circuitry of the processor, such as second-type execution circuits 314 of FIG. 3B or floating-point/vector execution circuits of FIG. 2. Replication of certain execution circuits within the load/store circuit of the processor allows certain instructions involving transfer of data from one type of register file to another to be executed in the load/store circuit as a single instruction operation, rather than requiring separate instruction operations for data transfer and performing the operation.

FIG. 4B is a block diagram illustrating example elements of an embodiment of a processor configured to execute a duplication instruction in its load/store circuit. Processor 420 of FIG. 4B is similar to processor 400 of FIG. 4A, except for including a register transfer execution circuit 407 that includes a duplication circuit 414. In an embodiment, a received instruction, such as instruction 318 of FIG. 3B, is executable to duplicate an integer value from an integer register file for storage in one or more vector elements of a vector in a vector register file. In an embodiment, the vector is in a packed-integer format. Duplication circuit 414 is configured to carry out the duplication operation when such an instruction is decoded into a fused instruction operation for execution in register transfer execution circuit 407. In an embodiment, register transfer execution circuit 407 is configured to store the duplicated value(s) in the destination register file (such as a register file of a vector execution circuit). In an embodiment, duplication circuit 414 is a replica of a duplication circuit used in execution circuitry of the processor, such as second-type execution circuits 314 of FIG. 3B or floating-point/vector execution circuits of FIG. 2. In various embodiments, a register transfer execution circuit such as register transfer execution circuit 407 includes one or more conversion circuits such as conversion circuit 410 of FIG. 4A in addition to one or more duplication circuits such as duplication circuit 414, along with circuitry to route a fused instruction operation such as instruction operation 326 of FIG. 3B to an appropriate execution circuit. Register transfer execution circuits as disclosed herein may in various embodiments include execution circuits for carrying out other operations specified by instructions specifying a transfer of data from a first type of register file to a second type of register file.

Figure 5:
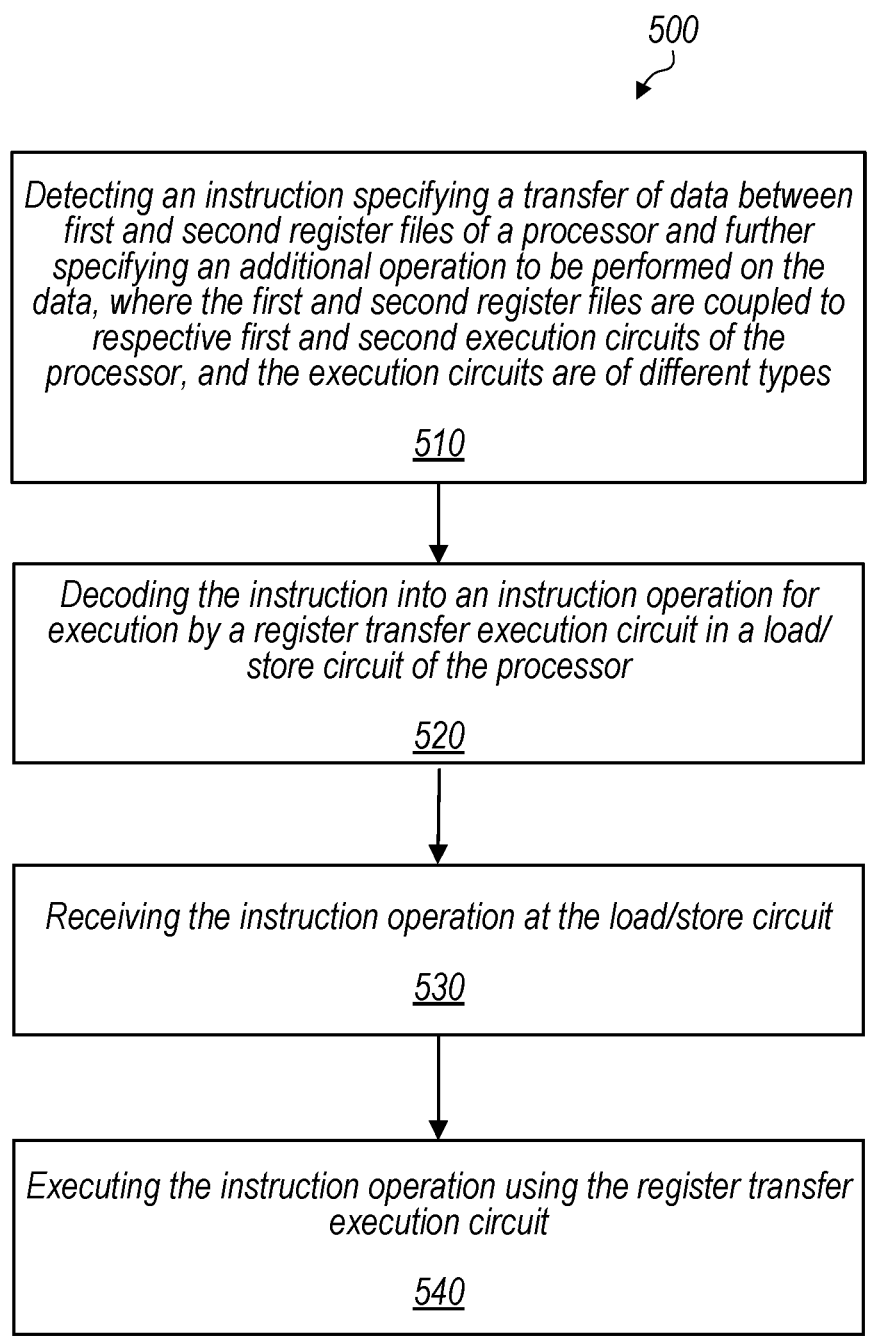
FIG. 5 is a flow diagram illustrating an example method relating to executing an instruction specifying a transfer of data between register files of a processor, according to some embodiments.

FIG. 5 is a flow diagram illustrating an example of a method relating to executing an instruction specifying a transfer of data between register files of a processor, where the register files are coupled to execution circuits of different types, and further specifying an operation to be formed on the data. Method 500 is one embodiment of a method performed by a processor, such as processors 100, 200, 300, 400 or 420 of FIGS. 1-4B. Other embodiments of such a method may include more or fewer blocks than shown in FIG. 5. Method 500 includes, at block 510, detecting an instruction specifying a transfer of data between first and second register files of a processor and further specifying an additional operation to be performed using the data. The first and second register files are coupled to respective first and second execution circuits of the processor, so that the first register file is coupled to the first execution circuit and the second register file is coupled to the second execution circuit, and the execution circuits are of different types. As used herein, different types of execution circuits or register files are circuits or files configured or designated for different types of data. Such a type may include, for example, integer, floating-point, vector or scalar. In an embodiment, the detecting of block 510 is performed by a fetch and decode circuit of the processor, such as fetch and decode circuit 302 of FIG. 3B (or corresponding circuits in other drawings of this disclosure). The detecting may alternately be performed by an MDR circuit of the processor, such as MDR circuit 306 of FIG. 3B, in some embodiments, or by a combination of fetch and decode and MDR circuits.

In various embodiments, the first register file is not directly accessible by the second execution circuit, or the second register file is not directly accessible by the first execution circuit, or both. In further embodiments, the processor does not have a data bus connection between the second execution circuit and the first register file, or between the first execution circuit and the second register file, or between either of these combinations. An example of an instruction that may be detected at block 510 is instruction 318 of FIG. 3B. The additional operation specified by the instruction may be any type of operation suitable for performing using data being transferred between the first and second register files. In various embodiments, the additional operation may include an arithmetic, logical or bitwise operation. In some embodiments, the additional operation is a conversion operation between the first type and the second type.

Method 500 further includes, at block 520, decoding the instruction into an instruction operation for execution by a register transfer execution circuit in a load/store circuit of the processor. An example of an instruction operation for execution by a register transfer execution circuit is instruction operation 326 of FIG. 3B. In an embodiment, the decoding is performed by a combination of a fetch and decode circuit and an MDR circuit of the processor. For example, a fetch and decode circuit may decode the instruction into a pair of instruction operations such as instruction operations 320 and 322 of FIG. 3A, while an MDR circuit receives the two instruction operations but issues a single instruction operation, such as instruction operation 326 of FIG. 3B, for execution by a register transfer execution circuit such as circuit 140 of FIG. 3B. In other embodiments the decoding into a single instruction operation for execution by a register transfer execution circuit may be performed by either a fetch and decode or an MDR circuit acting alone.

The method further includes receiving the instruction operation at the load/store circuit (at block 530) and executing the instruction operation using the register transfer execution circuit (at block 540). The receiving and executing are performed by a load/store circuit, such as load/store circuit 330 of FIG. 3B, including a register transfer execution circuit, such as circuit 140 of FIG. 3B. In an embodiment, the receiving is performed by an issue port of the load/store circuit, such as issue port 150 of FIG. 3B. The receiving may in some embodiments be performed by a reservation station such as RS 232 of FIG. 4B. In some embodiments, method 500 may further include forwarding a result of executing the instruction operation to the second execution circuit of the processor. Such forwarding may include writing the result to the second register file of the processor in some embodiments. Forwarding the result may include using a forwarding network of the processor in some embodiments.

Figure 6:
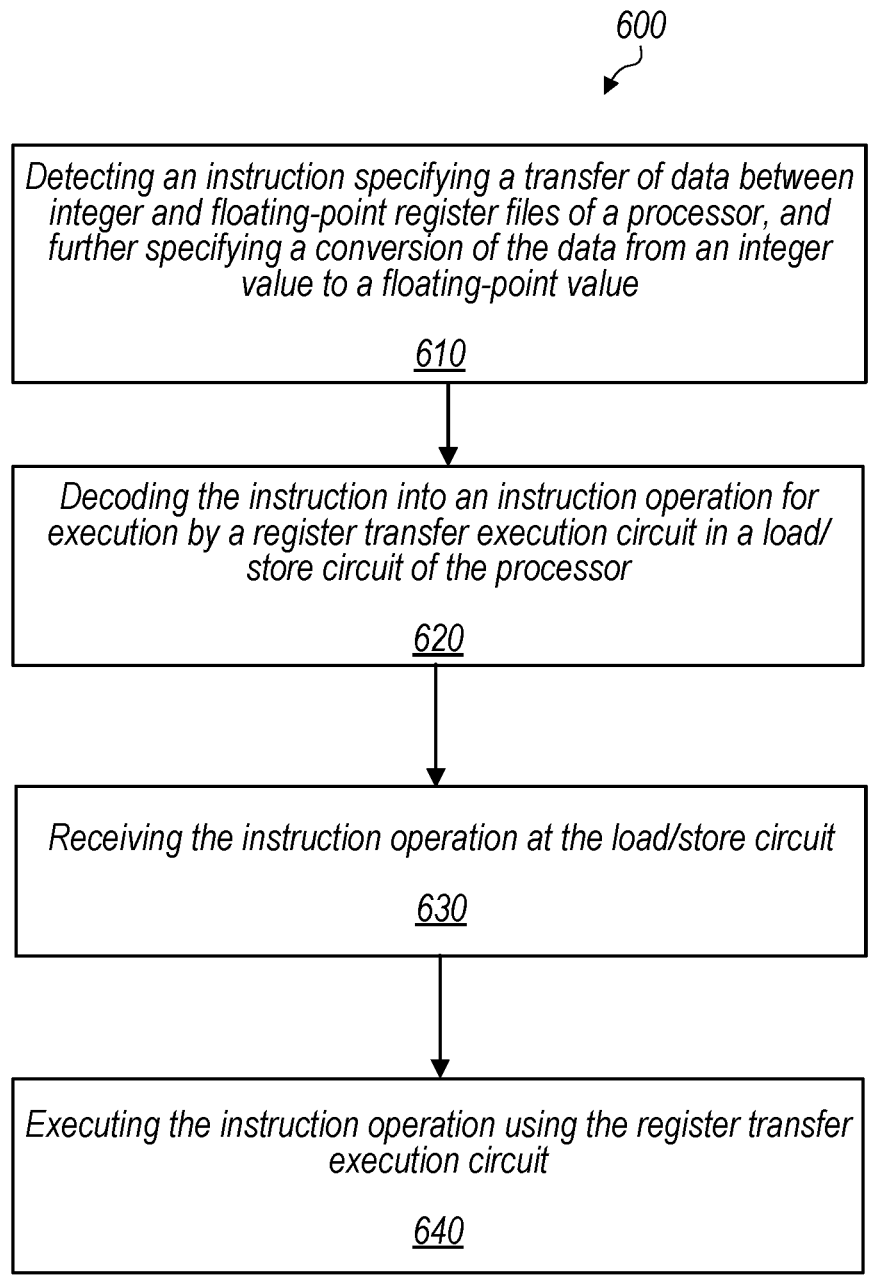
FIG. 6 is a flow diagram illustrating an example method relating to executing an instruction specifying a transfer of data between integer and floating-point register files of a processor, according to some embodiments.

FIG. 6 is a flow diagram illustrating an example of a method relating to executing an instruction specifying a transfer of data between integer and floating-point register files of a processor, and further specifying a conversion of the data from an integer value to a floating-point value. Method 600 is one embodiment of a method performed by a processor, such as processors 100, 200, 300, 400 or 420 of FIGS. 1-4B. Other embodiments of such a method may include more or fewer blocks than shown in FIG. 6. Method 600 represents a particular embodiment of the more general method 500 of FIG. 5. As implemented in the embodiment of method 600, the first register file of method 500 is an integer register file, and the second register file is a floating-point register file. The additional operation specified by the instruction detected in method 500 is implemented as a conversion operation in method 600.

Method 600 includes, at block 610, detecting an instruction specifying a transfer of data between integer and floating-point register files of a processor and further specifying a conversion of the data from an integer value to a floating-point value. In various embodiments, the integer register file is not directly accessible by a floating-point execution circuit of the processor, or the floating-point register file is not directly accessible by an integer execution circuit of the processor, or both. In further embodiments, the processor does not include a data bus connection between the floating-point execution circuit and the integer register file, between the integer execution circuit and the floating-point register file, or between either of these combinations. An example of an instruction that may be detected at block 610 is instruction 318 of FIG. 3B. The detecting of block 610 may in various embodiments be performed by a fetch and decode circuit, MDR circuit or combination of these, in a similar manner as described in connection with block 510 of method 500 in FIG. 5.

The method continues, at block 620, with decoding the instruction into an instruction operation for execution by a register transfer execution circuit in a load/store circuit of the processor. An example of an instruction operation for execution by a register transfer execution circuit is instruction operation 326 of FIG. 3B. The decoding of block 620 may in various embodiments be performed by a combination of a fetch and decode circuit and an MDR circuit in the processor or by one of these acting alone, in a similar manner as described in connection with block 520 of method 500.

Method 600 further includes receiving the instruction operation at the load/store circuit (at block 630) and executing the instruction operation using the register transfer execution circuit (at block 640). The receiving and executing are performed by a load/store circuit, such as load/store circuit 402 of FIG. 4A, including a register transfer execution circuit, such as circuit 405 of FIG. 4A. Register transfer execution circuit 405 includes conversion circuit 410 as an example of a circuit configured to perform the conversion specified by the instruction detected at block 610. In an embodiment, the receiving is performed by an issue port of the load/store circuit, such as issue port 150 of FIG. 3B. The receiving may in some embodiments be performed by a reservation station such as RS 232 of FIG. 4A. In some embodiments method 600 further includes forwarding a result of executing the instruction operation to a floating-point execution circuit of the processor. Such forwarding may include writing the result to the floating-point register file in some embodiments. Forwarding the result may including using a forwarding network of the processor in some embodiments.

Figure 7:
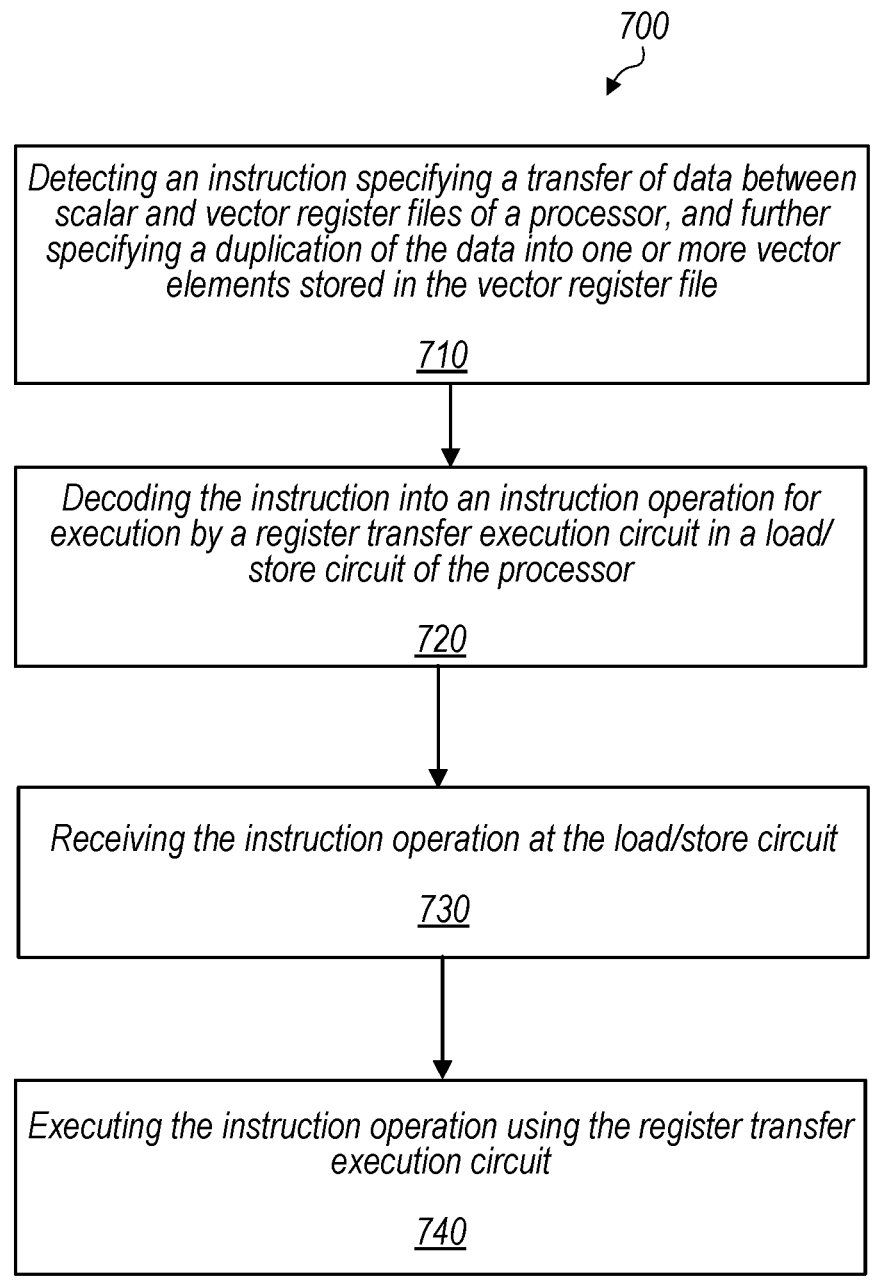
FIG. 7 is a flow diagram illustrating an example method relating to executing an instruction specifying a transfer of data between scalar and vector register files of a processor, according to some embodiments.

FIG. 7 is a flow diagram illustrating an example of a method relating to executing an instruction specifying a transfer of data between scalar and vector register files of a processor, and further specifying a duplication of the data into one or more vector elements stored in the vector register file. Method 700 is one embodiment of a method performed by a processor, such as processors 100, 200, 300, 400 or 420 of FIGS. 1-4B. Other embodiments of such a method may include more or fewer blocks than shown in FIG. 7. Method 700 represents a particular embodiment of the more general method 500 of FIG. 5. As implemented in the embodiment of method 700, the first register file of method 500 is a scalar register file, and the second register file is a vector register file. In some embodiments, the scalar register file is an integer register file and is coupled to an integer execution circuit. The additional operation specified by the instruction detected in method 500 is implemented as a duplication operation in method 700.

Method 700 includes, at block 710, detecting an instruction specifying a transfer of data between scalar and vector register files of a processor and further specifying a duplication of the data into one or more vector elements stored in the vector register file. In various embodiments, the scalar register file is not directly accessible by a vector execution circuit of the processor, or the vector register file is not directly accessible by a scalar execution circuit of the processor, or both. In further embodiments, the processor does not include a data bus connection between the vector execution circuit and the scalar register file, between the scalar execution circuit and the vector register file, or between either of these combinations. An example of an instruction that may be detected at block 710 is instruction 318 of FIG. 3B. The detecting of block 710 may in various embodiments be performed by a fetch and decode circuit, MDR circuit or combination of these, in a similar manner as described in connection with block 510 of method 500 in FIG. 5.

The method continues, at block 720, with decoding the instruction into an instruction operation for execution by a register transfer execution circuit in a load/store circuit of the processor. An example of an instruction operation for execution by a register transfer execution circuit is instruction operation 326 of FIG. 3B. The decoding of block 720 may in various embodiments be performed by a combination of a fetch and decode circuit and an MDR circuit in the processor or by one of these acting alone, in a similar manner as described in connection with block 520 of method 500.

Method 700 further includes receiving the instruction operation at the load/store circuit (at block 730) and executing the instruction operation using the register transfer execution circuit (at block 740). The receiving and executing are performed by a load/store circuit, such as load/store circuit 412 of FIG. 4B, including a register transfer execution circuit, such as circuit 407 of FIG. 4B. Register transfer execution circuit 407 includes duplication circuit 414 as an example of a circuit configured to perform the duplication specified by the instruction detected at block 710. In an embodiment, the receiving is performed by an issue port of the load/store circuit, such as issue port 150 of FIG. 3B. The receiving may in some embodiments be performed by a reservation station such as RS 232 of FIG. 4B. In some embodiments method 700 further includes forwarding a result of executing the instruction operation to a vector execution circuit of the processor. Such forwarding may include writing the result to the vector register file in some embodiments. Forwarding the result may including using a forwarding network of the processor in some embodiments.

Figure 8:
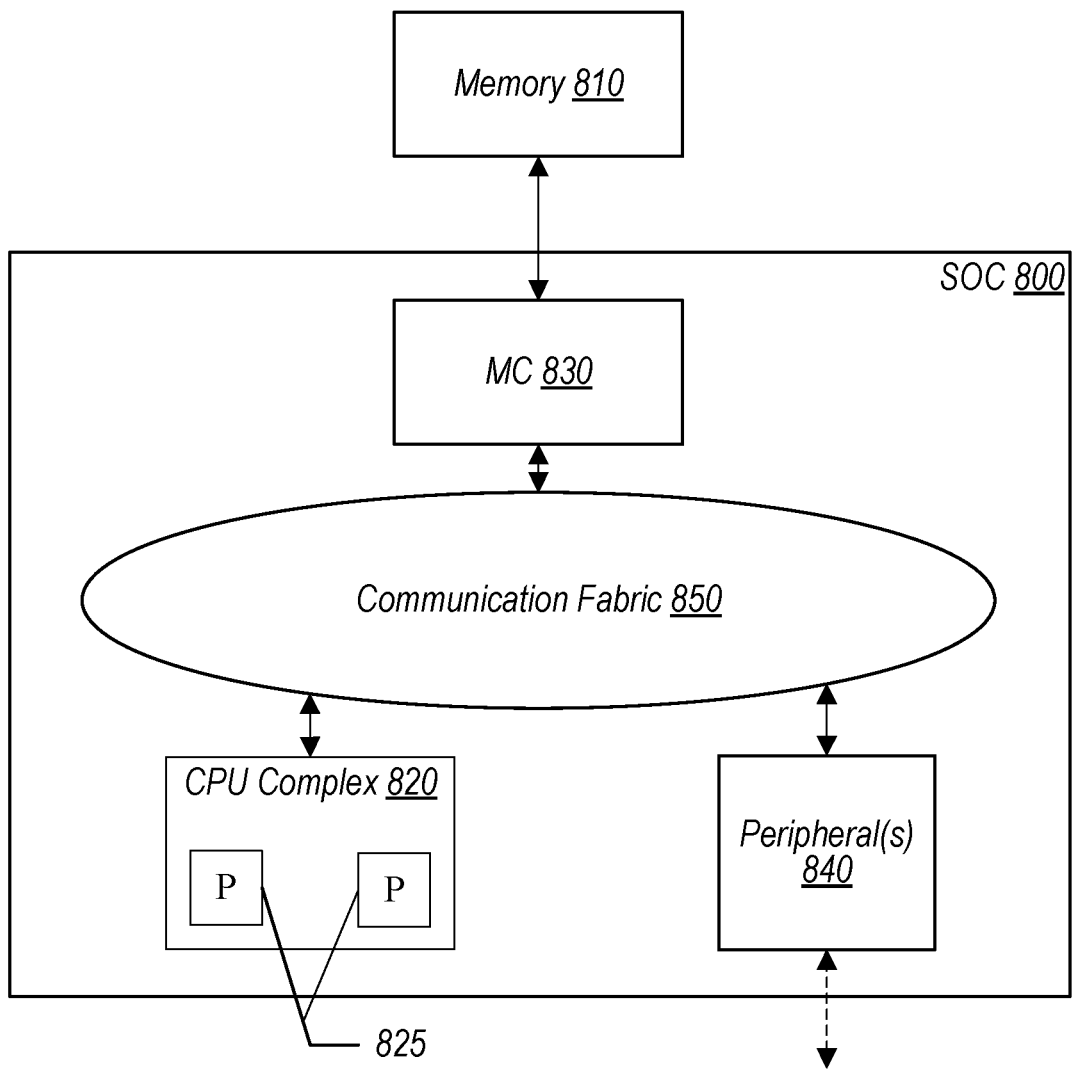
FIG. 8 is a block diagram illustrating example elements of a system on a chip (SOC) that is coupled to a memory, according to some embodiments.

Turning now to FIG. 8, a block diagram of an example system on a chip (SOC) 800 that is coupled to a memory 810 is depicted. As implied by the name, the components of SOC 800 can be integrated onto a single semiconductor substrate as an integrated circuit "chip." In some cases, however, the components are implemented on two or more discrete chips in a computing system. In the illustrated embodiment, the components of SOC 800 include a central processing unit (CPU) complex 820, a memory controller (MC) 830, one or more peripheral components 840 (more briefly, "peripherals"), and a communication fabric 850. Components 820, 830, and 840 are all coupled to communication fabric 850 as depicted, and memory controller 830 may be coupled to memory 810 during use. Also as shown, CPU complex 820 includes at least two processors 825 (P 825 in FIG. 8). In some embodiments, SOC 800 is implemented differently than shown. For example, SOC 800 may include an always-on component, a display controller, a power management circuit, etc. It is noted that the number of components of SOC 800 (and the number of subcomponents for those shown in FIG. 8, such as within the CPU complex 820) may vary between embodiments. Accordingly, there may be more or fewer of each component or subcomponent than the number shown in FIG. 8.

Memory 810, in various embodiments, is usable to store data and program instructions that are executable by CPU complex 820 to cause a system having SOC 800 and memory 810 to implement operations described herein. Memory 810 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), etc. Memory available to SOC 800 is not limited to primary storage such as memory 810. Rather, SOC 800 may further include other forms of storage such as cache memory (e.g., L1 cache, L2 cache, etc.) in CPU complex 820.

CPU complex 820, in various embodiments, includes a set of processors 825 that serve as a CPU of the SOC 800. Processors 825 may execute the main control software of the system, such as an operating system. Generally, software executed by the CPU during use control the other components of the system to realize the desired functionality of the system. Processors 825 may further execute other software, such as application programs. An application program may provide user functionality and rely on the operating system for lower-level device control, scheduling, memory management, etc. Consequently, processors 825 may also be referred to as application processors. CPU complex 820 may include other hardware such as an L2 cache and/or an interface to the other components of the system (e.g., an interface to communication fabric 850).

A processor 825, in various embodiments, includes any circuitry and/or microcode that is configured to execute instructions defined in an instruction set architecture implemented by that processor 825. Processors 825 may fetch instructions and data from memory 810 as a part of executing load instructions and store the fetched instructions and data within caches of CPU complex 820. In various embodiments, processors 825 share a common last level cache (e.g., an L2 cache) while including their own caches (e.g., an L0 cache, an L1 cache, etc.) for storing instructions and data. Processors 825 may retrieve instructions and data (e.g., from the caches) and execute the instructions (e.g., conditional branch instructions, ALU instructions, etc.) to perform operations that involve the retrieved data. Processors 825 may then write a result of those operations back to memory 810. Processors 825 may encompass discrete microprocessors, processors and/or microprocessors integrated into multichip module implementations, processors implemented as multiple integrated circuits, etc.

Memory controller 830, in various embodiments, includes circuitry that is configured to receive, from the other components of SOC 800, memory requests (e.g., load/store requests) to perform memory operations, such as accessing data from memory 810. Memory controller 830 may be configured to access any type of memory 810, such as those discussed earlier. In various embodiments, memory controller 830 includes queues for storing memory operations, for ordering and potentially reordering the operations and presenting the operations to memory 810. Memory controller 830 may further include data buffers to store write data awaiting write to memory 810 and read data awaiting return to the source of a memory operation. In some embodiments, memory controller 830 may include a memory cache to store recently accessed memory data. In SOC implementations, for example, the memory cache may reduce the power consumption in SOC 800 by avoiding re-access of data from memory 810 if it is expected to be accessed again soon. In some cases, the memory cache may also be referred to as a system cache, as opposed to private caches (e.g., L1 caches) in processors 825 that serve only certain components. But, in some embodiments, a system cache need not be located within memory controller 830.

Peripherals 840, in various embodiments, are sets of additional hardware functionality included in SOC 800. For example, peripherals 840 may include video peripherals such as an image signal processor configured to process image capture data from a camera or other image sensor, GPUs, video encoder/decoders, scalers, rotators, blenders, display controllers, etc. As other examples, peripherals 840 may include audio peripherals such as microphones, speakers, interfaces to microphones and speakers, audio processors, digital signal processors, mixers, etc. Peripherals 840 may include interface controllers for various interfaces external to SOC 800, such as Universal Serial Bus (USB), peripheral component interconnect (PCI) including PCI Express (PCIe), serial and parallel ports, etc. The interconnection to external devices is illustrated by the dashed arrow in FIG. 8 that extends external to SOC 800. Peripherals 840 may include networking peripherals such as media access controllers (MACs).

Communication fabric 850 may be any communication interconnect and protocol for communicating among the components of SOC 800. For example, communication fabric 850 may enable processors 825 to issue and receive requests from peripherals 840 to access, store, and manipulate data. In some embodiments, communication fabric 850 is bus-based, including shared bus configurations, cross bar configurations, and hierarchical buses with bridges. In some embodiments, communication fabric 850 is packet-based, and may be hierarchical with bridges, cross bar, point-to-point, or other interconnects.

Figure 9:
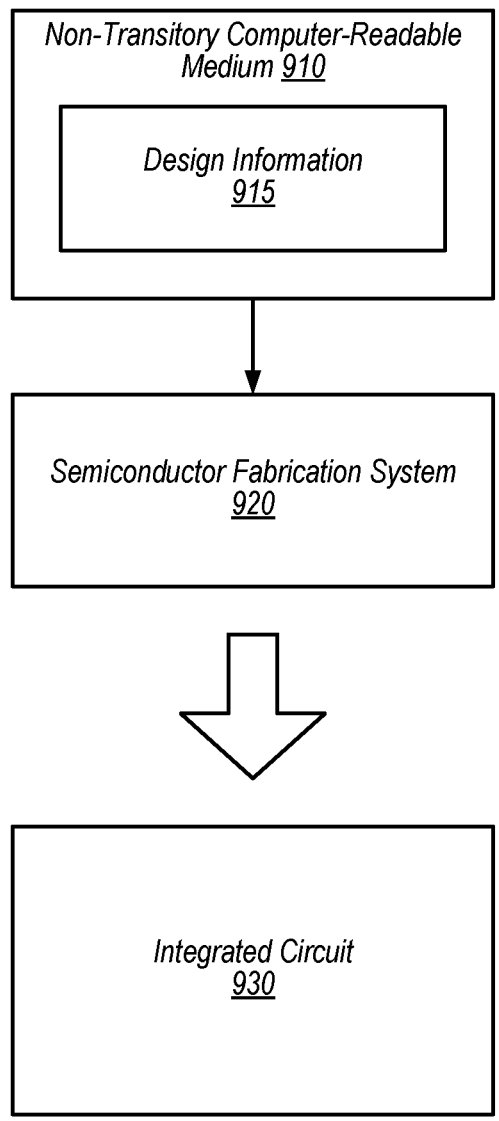
FIG. 9 is a block diagram illustrating an example process of fabricating at least a portion of an SOC, according to some embodiments.

Turning now to FIG. 9, a block diagram illustrating an example process of fabricating an integrated circuit 930 that can include at least a portion of SOC 800 is shown. The illustrated embodiment includes a non-transitory computer-readable medium 910 (which includes design information 915), a semiconductor fabrication system 920, and a resulting fabricated integrated circuit 930. In some embodiments, integrated circuit 930 includes at least a CPU complex 820, a memory controller 830, and one or more peripherals 840. Integrated circuit 930 may additionally or alternatively include other circuits such as a wireless network circuit. In the illustrated embodiment, semiconductor fabrication system 920 is configured to process design information 915 to fabricate integrated circuit 930.

Non-transitory computer-readable medium 910 may include any of various appropriate types of memory devices or storage devices. For example, non-transitory computer-readable medium 910 may include at least one of an installation medium (e.g., a CD-ROM, floppy disks, or tape device), a computer system memory or random-access memory (e.g., DRAM, DDR RAM, SRAM, EDO RAM, Rambus RAM, etc.), a non-volatile memory such as a Flash, magnetic media (e.g., a hard drive, or optical storage), registers, or other types of non-transitory memory. Non-transitory computer-readable medium 910 may include two or more memory mediums, which may reside in different locations (e.g., in different computer systems that are connected over a network).

Design information 915 may be specified using any of various appropriate computer languages, including hardware description languages such as, without limitation: VHDL, Verilog, SystemC, System Verilog, RHDL, M, MyHDL, etc. Design information 915 may be usable by semiconductor fabrication system 920 to fabricate at least a portion of integrated circuit 930. The format of design information 915 may be recognized by at least one semiconductor fabrication system 920. In some embodiments, design information 915 may also include one or more cell libraries, which specify the synthesis and/or layout of integrated circuit 930. In some embodiments, the design information is specified in whole or in part in the form of a netlist that specifies cell library elements and their connectivity. Design information 915, taken alone, may or may not include sufficient information for fabrication of a corresponding integrated circuit (e.g., integrated circuit 930). For example, design information 915 may specify circuit elements to be fabricated but not their physical layout. In this case, design information 915 may be combined with layout information to fabricate the specified integrated circuit.

Semiconductor fabrication system 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 920 may also be configured to perform various testing of fabricated circuits for correct operation.

In various embodiments, integrated circuit 930 is configured to operate according to a circuit design specified by design information 915, which may include performing any of the functionality described herein. For example, integrated circuit 930 may include any of various elements described with reference to FIGS. 1-8. Furthermore, integrated circuit 930 may be configured to perform various functions described herein in conjunction with other components. The functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

In some embodiments, a method of initiating fabrication of integrated circuit 930 is performed. Design information 915 may be generated using one or more computer systems and stored in non-transitory computer-readable medium 910. The method may conclude when design information 915 is sent to semiconductor fabrication system 920 or prior to design information 915 being sent to semiconductor fabrication system 920. Accordingly, in some embodiments, the method may not include actions performed by semiconductor fabrication system 920. Design information 915 may be sent to semiconductor fabrication system 920 in a variety of ways. For example, design information 915 may be transmitted (e.g., via a transmission medium such as the Internet) from non-transitory computer-readable medium 910 to semiconductor fabrication system 920 (e.g., directly or indirectly). As another example, non-transitory computer-readable medium 910 may be sent to semiconductor fabrication system 920. In response to the method of initiating fabrication, semiconductor fabrication system 920 may fabricate integrated circuit 930 as discussed above.

Figure 10:
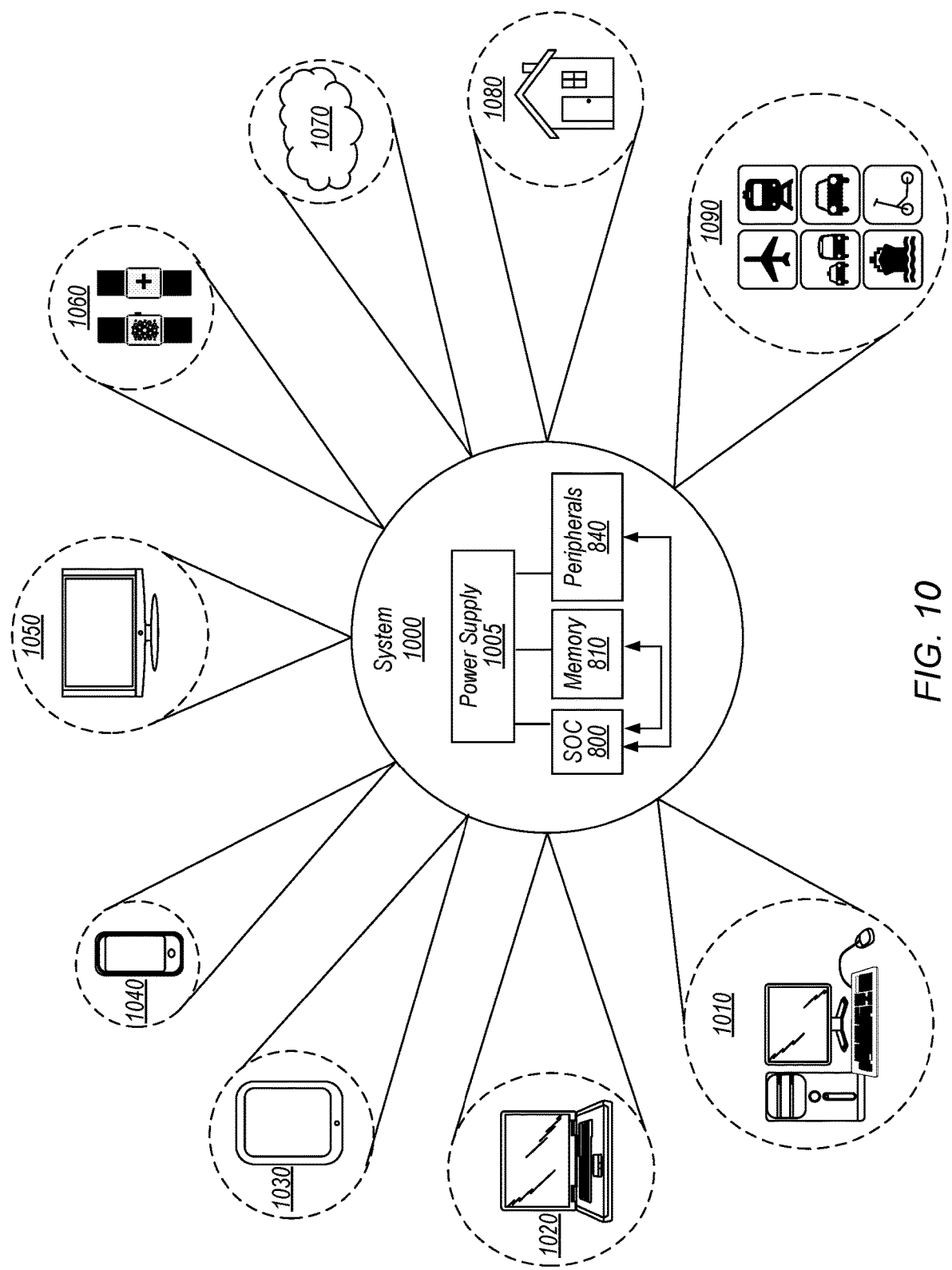
FIG. 10 is a block diagram illustrating an example SOC that is usable in various types of systems, according to some embodiments.

Turning next to FIG. 10, a block diagram of one embodiment of a system 1000 is shown that may incorporate and/or otherwise utilize the methods and mechanisms described herein. In the illustrated embodiment, the system 1000 includes at least one instance of a system on chip (SOC) 800 that is coupled to external memory 810, peripherals 840, and a power supply 1005. Power supply 1005 provides supply voltages to SOC 800 as well as one or more supply voltages to the memory 810 and/or the peripherals 840. In various embodiments, power supply 1005 represents a battery (e.g., a rechargeable battery in a smart phone, laptop or tablet computer, or other device). In some embodiments, more than one instance of SOC 800 is included (and more than one external memory 810 is included as well).

As illustrated, system 1000 is shown to have application in a wide range of areas. For example, system 1000 may be utilized as part of the chips, circuitry, components, etc., of a desktop computer 1010, laptop computer 1020, tablet computer 1030, cellular or mobile phone 1040, or television 1050 (or set-top box coupled to a television). Also illustrated is a wearable device 1060 such as a smartwatch and/or health monitoring device. In some embodiments, a smartwatch may include a variety of general-purpose computing related functions. For example, a smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 1000 may further be used as part of a cloud-based service(s) 1070. For example, the previously mentioned devices, and/or other devices, may access computing resources in the cloud (e.g., remotely located hardware and/or software resources). Still further, system 1000 may be utilized in one or more devices of a home 1080 other than those previously mentioned. For example, appliances within home 1080 may monitor and detect conditions that warrant attention. For example, various devices within home 1080 (e.g., a refrigerator, a cooling system, etc.) may monitor the status of the device and provide an alert to the homeowner (or, for example, a repair facility) should a particular event be detected. Alternatively, a thermostat may monitor the temperature in home 1080 and may automate adjustments to a heating/cooling system based on a history of responses to various conditions by the homeowner. Also illustrated in FIG. 10 is the application of system 1000 to various modes of transportation 1090. For example, system 1000 may be used in the control and/or entertainment systems of aircraft, trains, buses, cars for hire, private automobiles, waterborne vessels from private boats to cruise liners, scooters (for rent or owned), and so on. In various cases, system 1000 may be used to provide automated guidance (e.g., self-driving vehicles), general systems control, and otherwise. These any many other embodiments are possible and are contemplated. It is noted that the devices and applications illustrated in FIG. 10 are illustrative only and are not intended to be limiting. Other devices are possible and are contemplated.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner.

Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement of such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail.

Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A processor, comprising:
   a first execution circuit of a first type;
   a second execution circuit of a second type different from the first type;
   a first register file coupled to the first execution circuit;
   a second register file coupled to the second execution circuit; and
   a load/store circuit coupled to the first register file and the second register file, the load/store circuit comprising:
   an issue port configured to receive an instruction operation for execution;
   a memory execution circuit configured to execute memory access instruction operations; and
   a register transfer execution circuit configured to execute an instruction operation specifying a transfer of data from the first register file to the second register file and further specifying an additional operation to be performed using the data; and
   wherein the load/store circuit is configured to direct a given instruction operation from the issue port to one of the memory execution circuit or the register transfer execution circuit.

2. The processor of claim 1, wherein the first execution circuit is an integer execution circuit and the second execution circuit is a floating-point execution circuit.

3. The processor of claim 1, wherein the first execution circuit is a scalar execution circuit and the second execution circuit is a vector execution circuit.

4. The processor of claim 1, wherein the first register file comprises a general-purpose register file.

5. The processor of claim 1, wherein:
   the additional operation is an integer-to-floating-point conversion operation; and
   the register transfer execution circuit includes an integer-to-floating-point conversion circuit.

6. The processor of claim 5, wherein the second execution circuit includes an additional integer-to-floating point conversion circuit.

7. The processor of claim 1, wherein:
   the additional operation is a duplication operation; and
   the register transfer execution circuit includes a duplication circuit configured to read a value from the first register file and copy the value to one or more vector elements stored in the second register file.

8. The processor of claim 1, further comprising a decoder circuit coupled to the load/store circuit, wherein the decoder circuit is configured to:
   receive a fetched transfer instruction involving transfer of data from the first register file to the second register file; and
   decode the fetched transfer instruction into an instruction operation for execution by the register transfer execution circuit.

9. The processor of claim 1, wherein the first register file is not directly accessible by the second execution circuit and the second register file is not directly accessible by the first execution circuit.

10. The processor of claim 1, wherein the first register file is configured to store values of the first type and the second register file is configured to store values of the second type.

11. The processor of claim 1, wherein the issue port comprises a reservation station.

12. The processor of claim 1, further comprising a dispatch circuit configured to issue to the load/store circuit the instruction operation specifying a transfer of data from the first register file to the second register file and further specifying an additional operation to be performed using the data.

13. The processor of claim 12, wherein the dispatch circuit is configured to issue the instruction operation to the issue port of the load/store circuit.

14. A method, comprising:
   detecting, by a processor, an instruction specifying a transfer of data between first and second register files of the processor and further specifying an additional operation to be performed using the data, wherein the first and second register files are coupled to respective first and second execution circuits of the processor, and wherein the first and second execution circuits are of different types;
   decoding, by the processor, the instruction into an instruction operation for execution by a register transfer execution circuit in a load/store circuit of the processor;
   receiving, by the processor, the instruction operation at the load/store circuit; and
   executing, by the processor and using the register transfer execution circuit, the instruction operation.

15. The method of claim 14, wherein:
   specifying the additional operation includes specifying conversion of an integer value from the first register file to a floating-point value; and
   the register transfer execution circuit includes an integer-to-floating-point conversion circuit.

16. The method of claim 14, wherein
   specifying the additional operation includes specifying reading of a scalar value from the first register file and copying of the scalar value to one or more vector elements stored in the second register file.

17. The method of claim 14, further comprising dispatching, by the processor, the instruction operation to an issue port of the load/store circuit.

18. A non-transitory computer readable medium having stored thereon design information that specifies, in a format recognized by a fabrication system that is configured to use the design information, a circuit design for a processor, the processor comprising:
   a first execution circuit of a first type;

a second execution circuit of a second type different from the first type;
a first register file coupled to the first execution circuit;
a second register file coupled to the second execution circuit; and
a load/store circuit coupled to the first register file and the second register file, the load/store circuit comprising:
an issue port configured to receive an instruction operation for execution;
a memory execution circuit configured to execute memory access instruction operations; and
a register transfer execution circuit configured to execute an instruction operation specifying a transfer of data from the first register file to the second register file and further specifying an additional operation to be performed using the data; and
wherein the load/store circuit is configured to direct a given instruction operation from the issue port to one of the memory execution circuit or the register transfer execution circuit.

19. The computer readable medium of claim 18, wherein:
the first execution circuit is an integer execution circuit;
the second execution circuit is a floating-point execution circuit;
the additional operation is an integer-to-floating point conversion operation; and
the register transfer execution circuit includes an integer-to-floating-point conversion circuit.

20. The computer readable medium of claim 18, wherein:
the first execution circuit is a scalar execution circuit;
the second execution circuit is a vector execution circuit;
the additional operation is a duplication operation; and
the register transfer execution circuit includes a duplication circuit configured to read a value from the first register file and copy the value to one or more vector elements stored in the second register file.

* * * * *